United States Patent
Gaal et al.

(10) Patent No.: US 8,655,395 B2
(45) Date of Patent: Feb. 18, 2014

(54) SYSTEMS, METHODS AND APPARATUS FOR FACILITATING DISCONTINUOUS RECEPTION

(75) Inventors: Peter Gaal, San Diego, CA (US); Jelena M. Damnjanovic, Del Mar, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 604 days.

(21) Appl. No.: 12/764,590

(22) Filed: Apr. 21, 2010

(65) Prior Publication Data

US 2011/0105069 A1   May 5, 2011

Related U.S. Application Data

(60) Provisional application No. 61/175,400, filed on May 4, 2009.

(51) Int. Cl.
*H04B 7/00* (2006.01)
*H04B 17/00* (2006.01)

(52) U.S. Cl.
USPC ........................... 455/515; 455/67.11

(58) Field of Classification Search
USPC .......... 455/515, 59, 67.11; 370/464, 480, 485
See application file for complete search history.

(56) References Cited

U.S. PATENT DOCUMENTS

| | | | |
|---|---|---|---|
| 2011/0128925 A1* | 6/2011 | Lindoff et al. | 370/329 |
| 2012/0014306 A1* | 1/2012 | Pelletier et al. | 370/311 |

OTHER PUBLICATIONS

Catt: "Consideration on DRX" 3GPP Draft; R2-092992, 3rd Generation Partnership Project (3GPP), Mobile Competence Centre ; 650, Route Des Lucioles ; F-06921 Sophia-Antipolis Cedex ; France, No. San Francisco, USA; Apr. 28, 2009, XP050340776.
Ericsson, "Carrier aggregation in LTE-Advanced", 3GPP Draft, R1-082468, 3rd Generation Partnership Project (3GPP), Mobile Competence Centre, 650, Route Des Lucioles, F-06921 Sophia-Antipolis Cedex, France, vol. RAN WG1, No. Warsaw, Poland, Jun. 30, 2008, XP002541667.
Ericsson et al: "DRX with Carrier Aggregation" 3GPP Draft; R2-096751 DRX With Carrier Aggregation, 3rd Generation Partnership Project (3GPP), Mobile Competence Centre ; 650, Route Des Lucioles ; F-06921 Sophia-Antipolis Cedex ; France, No. Jeju; Oct. 9, 2009, XP050391222.
Ericsson: "DRX with Carrier Aggregation in LTE-Advanced" 3GPP Draft; R2-092959 DRX in Carrier Aggregation LTE-Advanced, SRD Generation Partnership Project (3GPP), Mobile Competence Centre ; 650, Route Des Lucioles ; F-06921 Sophia-Antipolis Cedex ; France, No. San Francisco, USA; Apr. 28, 2009, XP050340753.

(Continued)

Primary Examiner — Nguyen Vo
(74) Attorney, Agent, or Firm — Paul Kuo

(57) ABSTRACT

Systems, methods and apparatus for facilitating discontinuous reception are provided. An example of a first method can include providing one or more discontinuous reception cycles respectively corresponding to one or more inactivity periods. During respective awake periods of the one or more discontinuous reception cycles, data can be received on respective ones of one or more frequency carriers. The number and type of the one or more frequency carriers on which data is received can be determined based on the one or more inactivity periods. Further, in some embodiments, in addition to providing discontinuous reception on selected frequency carriers, data can be received according to continuous reception on other frequency carriers, such as the anchor carrier.

31 Claims, 16 Drawing Sheets

(56) References Cited

OTHER PUBLICATIONS

Etri: "DRX operation for LTE-Advanced UE" 3GPP Draft; R2-096510 DRX Operation for LTE-Advanced UE, SRD Generation Partnership Project (3GPP), Mobile Competence Centre ; 650, Route Des Lucioles ; F-06921 Sophia-Antipolis Cedex ; France, No. Jeju; Nov. 9, 2009, XP050391097.

Fujitsu: "Anchor component carrier and preferred control signal structure" 3GPP Draft; RI-091503, SRD Generation Partnership Project (3GPP), Mobile Competence Centre ; 650, Route Des Lucioles ; F-06921 Sophia-Antipolis Cedex ; France, No. Seoul, Korea; Mar. 18, 2009, XP050339062.

International Search Report and Written Opinion—PCT/US2010/033611, International Search Authority—European Patent Office—Aug. 6, 2006.

Itri: "Discussion of DRX in Carrier Aggregation" 3GPP Draft; R2-096042, 3rd Generation Partnership Project (3GPP), Mobile Competence Centre ; 650, Route Des Lucioles ; F-06921 Sophia-Antipolis Cedex ; France, No. Miyazaki; Oct. 12, 2009, XP050390454.

LG Electronics: "DRX Scheme (Doc. No. R2-0632248)" , [Online] No. R2-063248, Nov. 6, 2006, pp. 1-4, XP002504706 Retrieved from the Internet: URL:ftp://ftp.3gpp.org/tsg_ran/WG2_RL2/TSG R2_56/Documents/R2-063248.zi p>.

Mediatek: "DRX Operation in Carrier Aggregation Mode for LTE-A" 3GPP Draft; R2-094258, SRD Generation Partnership Project (3GPP), Mobile Competence Centre ; 650, Route Des Lucioles ; F-06921 Sophia-Antipolis Cedex ; France, No. Shenzhen, China; Aug. 18, 2009, XP050352511.

Nokia: "DRX parameters in LTE" 3rd Generation Partnership Project (3GPP); TechnicalSpecification Group (TSG) Radio Access Network (RAN); WorkingGroup 2 (WG2), XX, XX, vol. R2-071285, Mar. 26, 2007, pp. 1-7, XP003023549.

Philips: "PDCCH for Carrier Aggregation" 3GPP Draft; RI-092034, 3rd Generation Partnership Project (3GPP), Mobile Competence Centre ; 650, Route Des Lucioles ; F-06921 Sophia-Antipolis Cedex ; France, No. San Francisco, USA; Apr. 29, 2009, XP050339502.

Research in Motion UK Limited: "DRX Operation for Carrier Aggregation" 3GPP Draft; R2-093732, SRD Generation Partnership Project (3GPP), Mobile Competence Centre ; 650, Route Des Lucioles ; F-06921 Sophia-Antipolis Cedex ; France, No. Los Angeles, USA; 20090622, Jun. 22, 2009, XP050351965.

Research in Motion UK Limited: "DRX Operation for Carrier Aggregation" 3GPP Draft; R2-094283, SRD Generation Partnership Project (36PP), Mobile Competence Centre ; 650, Route Des Lucioles ; F-06921 Sophia-Antipolis Cedex ; France, No. Shenzhen, China; 20090817, Aug. 17, 2009, XP050352527.

Taiwan Search Report—TW099114271—TIPO -—Mar. 18, 2013.

* cited by examiner

SYSTEMS, METHODS AND APPARATUS FOR FACILITATING DISCONTINUOUS RECEPTION

CROSS-REFERENCE TO RELATED APPLICATIONS

This application claims the benefit of U.S. Provisional Patent Application Ser. No. 61/175,400, entitled "Systems and Methods for Discontinuous Reception in Multicarrier Wireless Communication Systems," which was filed May 4, 2009, and the entire contents of which are incorporated herein by reference.

BACKGROUND

I. Field

The following description relates to wireless communications, in general, and to facilitating discontinuous reception in multicarrier wireless communication systems, in particular.

II. Background

Wireless communication systems are widely deployed to provide various types of communication. For instance, voice and/or data can be provided via such wireless communication systems. A typical wireless communication system, or network, can provide multiple users access to one or more shared resources (e.g., bandwidth, transmit power). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless multiple-access communication systems can simultaneously support communication for multiple user equipments (UEs). Each UE can communicate with one or more base stations (BSs) via transmissions on forward and reverse links. The forward link (or downlink (DL)) refers to the communication link from BSs to UEs, and the reverse link (or uplink (UL)) refers to the communication link from UEs to BSs. This communication link can be established via a single-in-single-out, multiple-in-single-out or a multiple-in-multiple-out (MIMO) system.

MIMO systems commonly employ multiple ($N_T$) transmit antennas and multiple ($N_R$) receive antennas for data transmission. A MIMO channel formed by the $N_T$ transmit and $N_R$ receive antennas can be decomposed into $N_S$ independent channels, which can be referred to as spatial channels, where $N_S \leq \{N_T, N_R\}$. Each of the $N_S$ independent channels corresponds to a dimension. Moreover, MIMO systems can provide improved performance (e.g., increased spectral efficiency, higher throughput and/or greater reliability) if the additional dimensionalities created by the multiple transmit and receive antennas are utilized.

MIMO systems can support various duplexing techniques to divide forward and reverse link communications over a common physical medium. For instance, frequency division duplex (FDD) systems can utilize disparate frequency regions for forward and reverse link communications. Further, in time division duplex (TDD) systems, forward and reverse link communications can employ a common frequency region so that the reciprocity principle allows estimation of the forward link channel from reverse link channel.

Wireless communication systems oftentimes employ one or more BSs to provide a coverage area. A typical BS can transmit multiple data streams for broadcast, multicast and/or unicast services, wherein a data stream may be a stream of data that can be of independent reception interest to a UE. An UE within the coverage area of such BS can be employed to receive one, more than one, or all the data streams carried by the composite stream. Likewise, a UE can transmit data to the BS or to another UE.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating discontinuous reception (DRX) in multicarrier wireless communication systems.

According to related aspects, an apparatus is provided. The apparatus can include a control unit for performing DRX based, at least, on parameters indicative of: one or more inactivity periods of the apparatus; and one or more sets of frequency carriers at which the apparatus is configured to monitor and receive data.

According to other related aspects, another apparatus is provided. The apparatus can include: means for performing DRX based, at least, on parameters indicative of: one or more inactivity periods of the apparatus; and one or more sets of frequency carriers at which the apparatus is configured to monitor and receive data.

Still, according to other related aspects, another apparatus is provided. The apparatus can include a multicarrier receiver. The multicarrier receiver can be for concurrently receiving data on selected one or more frequency carriers after a selected inactivity period of the multicarrier receiver. The receiving can be based on DRX configuration information including parameters indicative of the selected one or more frequency carriers and indicative of the selected inactivity period of the multicarrier receiver.

Yet, according to other related aspects, another apparatus is provided. The apparatus can include means for concurrently receiving data. The means for concurrently receiving data can be for receiving data on selected one or more frequency carriers after a selected inactivity period of the means for concurrently receiving data. The receiving can be based on DRX configuration information including parameters indicative of the selected one or more frequency carriers and indicative of the selected inactivity period of the means for concurrently receiving data.

According to other related aspects, another apparatus is provided. The apparatus can include a control unit for performing DRX according to DRX configuration information including time-based and frequency-based parameters.

Yet, according to other related aspects, yet another apparatus is provided. The apparatus can include means for performing DRX according to DRX configuration information including time-based and frequency-based parameters.

According to another aspect, a method that facilitates DRX is provided. The method can include: employing a processor for executing computer executable instructions to provide one or more DRX cycles respectively corresponding to one or more inactivity periods. During respective awake periods of the one or more DRX cycles, data can be received on respective ones of one or more frequency carriers.

According to another aspect, a computer program product is provided. The computer program product can include a computer-readable medium. The computer-readable medium can include code. The code can be for providing one or more DRX cycles respectively corresponding to one or more inactivity periods. During respective awake periods of the one or more DRX cycles, respective ones of one or more frequency carriers can be monitored for data reception.

Still according to another aspect, a method that facilitates DRX can be provided. The method can include, in response to a first inactivity period, operating in a first state wherein a first DRX cycle is provided and a first one or more of a plurality of frequency carriers of the multicarrier wireless system is monitored to receive data during an awake period of the first DRX cycle. The method can also include, in response to a second inactivity period, operating in a second state wherein a second DRX cycle is provided and a second one or more of the plurality of frequency carriers of the multicarrier wireless system is monitored to receive data during an awake period of the second DRX cycle. The method can also include, in response to a third inactivity period, operating in a third state wherein a third DRX cycle is provided and a third one or more of the plurality of frequency carriers of the multicarrier wireless system is monitored to receive data during an awake period of the third DRX cycle.

According to yet another aspect, another computer program product is provided. The computer program product can include a computer-readable medium. The computer-readable medium can include code for, in response to a first inactivity period, operating in a first state. A first DRX cycle can be provided and a first one or more of a plurality of frequency carriers of the multicarrier wireless system can be monitored to receive data during an awake period of the first DRX cycle. The computer-readable medium can also include code for, in response to a second inactivity period, operating in a second state. A second DRX cycle can be provided and a second one or more of the plurality of frequency carriers of the multicarrier wireless system can be monitored to receive data during an awake period of the second DRX cycle. The computer-readable medium can also include code for, in response to a third inactivity period, operating in a third state. A third DRX cycle can be provided and a third one or more of the plurality of frequency carriers of the multicarrier wireless system can be monitored to receive data during an awake period of the third DRX cycle.

Yet, according to another aspect, an apparatus is provided. The apparatus can include a DRX control unit. The DRX control unit can also include: a communication unit for receiving data on one or more frequency carriers and for receiving DRX configuration information; and a frequency carrier selection unit for selecting one or more frequency carriers on which to receive the data. The DRX control unit can also include: an awake-sleep period control unit for controlling an awake period and a sleep period of the apparatus; and an inactivity period evaluation unit for evaluating an inactivity period of the apparatus. The DRX control unit can also include: a memory for storing received DRX configuration information. The one or more frequency carriers can be selected, and the inactivity period can be evaluated, based on the received DRX configuration information.

Still, according to yet another, another apparatus is provided. The apparatus can include means for performing DRX. The means for performing DRX can include means for receiving content. The means for receiving content can be for receiving data on one or more frequency carriers and for receiving DRX configuration information. The means for performing DRX can also include: means for selecting one or more frequency carriers on which to receive the data; means for controlling an awake period and a sleep period of the apparatus; and means for evaluating an inactivity period of the apparatus. The means for performing DRX can include means for storing received DRX configuration information. The one or more frequency carriers can be selected, and the inactivity period can be evaluated, based on the received DRX configuration information.

Further still, according to yet another aspect, a system is provided. The system can include a control unit configured to generate DRX control information based on time and frequency parameters. The generated DRX control information can correspond to one of a plurality of levels of DRX. The control unit can also be configured to output the generated DRX control information. The system can also include UE capable of performing multicarrier reception of data. The UE can be communicatively coupled to the control unit and configured to: receive the output DRX control information; and perform DRX. The DRX can be performed on one or more frequency carriers on which the UE is configured to perform multicarrier reception according to one of the plurality of levels of DRX.

Yet, according to another aspect, another system is provided. The system can include means for generating DRX control information based on time and frequency parameters. The generated DRX control information can correspond to a plurality of levels of DRX. The system can also include: means for outputting the generated DRX control information; and means for communicating. The means for communicating can be capable of performing multicarrier reception of data, and the means for communicating can be communicatively coupled to the means for generating DRX control information. The means for communicating can be configured to: receive the output DRX control information; and perform DRX. The DRX can be performed on one or more frequency carriers on which the means for communicating is configured to perform multicarrier reception according to one of the plurality of levels of DRX.

Further, according to other aspects, a method is provided. The method can include: generating, at a first apparatus, DRX control information based on time and frequency parameters, the generated DRX control information corresponding to a plurality of levels of DRX; and outputting the generated DRX control information. The method can also include: receiving, at a second apparatus capable of performing multicarrier reception of data, the output DRX control information; and performing DRX, on one or more frequency carriers on which the second apparatus is configured to perform multicarrier reception according to one of the plurality of levels of DRX.

Finally, according to other aspects, a system is provided. The system can include UE. The UE can include: a DRX control unit. The DRX control unit can include an awake-sleep period control unit for determining corresponding awake periods and sleep periods to create the DRX operation being or to be performed at the UE. The DRX control unit can include: an inactivity period evaluation unit for monitoring and determining a length of an inactivity period experienced at the UE; a frequency carrier selection unit for causing the UE to select one or more of the one or more frequency carriers to monitor and receive data on according to the DRX operation of the UE. The UE can also include: a memory for storing the received DRX configuration information, wherein the one or more frequency carriers is selected, and the inactivity period is evaluated, based on the received DRX configuration information. The UE can also include a first communication unit for receiving data on one or more frequency carriers and for receiving DRX configuration information, the DRX configuration information being indicative of a DRX operation at the UE. The system can also include a DRX control unit including: a second communication unit for transmitting the DRX configuration information. The DRX control unit can also include an inactivity period and carrier frequency traffic evaluation unit for determining the one or more frequency carriers on which DRX will be performed or the one or more inactivity periods corresponding to the one or more frequency carriers. The DRX control unit can also include a DRX configuration information generation unit for generating DRX configuration information indicative of the determined one or more frequency carriers on which the UE will perform DRX or the one or more inactivity periods on which the determination of the one or more frequency carriers is based. The system can also include a memory for storing the generated DRX configuration information.

Toward the accomplishment of the foregoing and related ends, the one or more embodiments comprise the features hereinafter fully described and particularly pointed out in the claims. The following description and the annexed drawings set forth herein detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
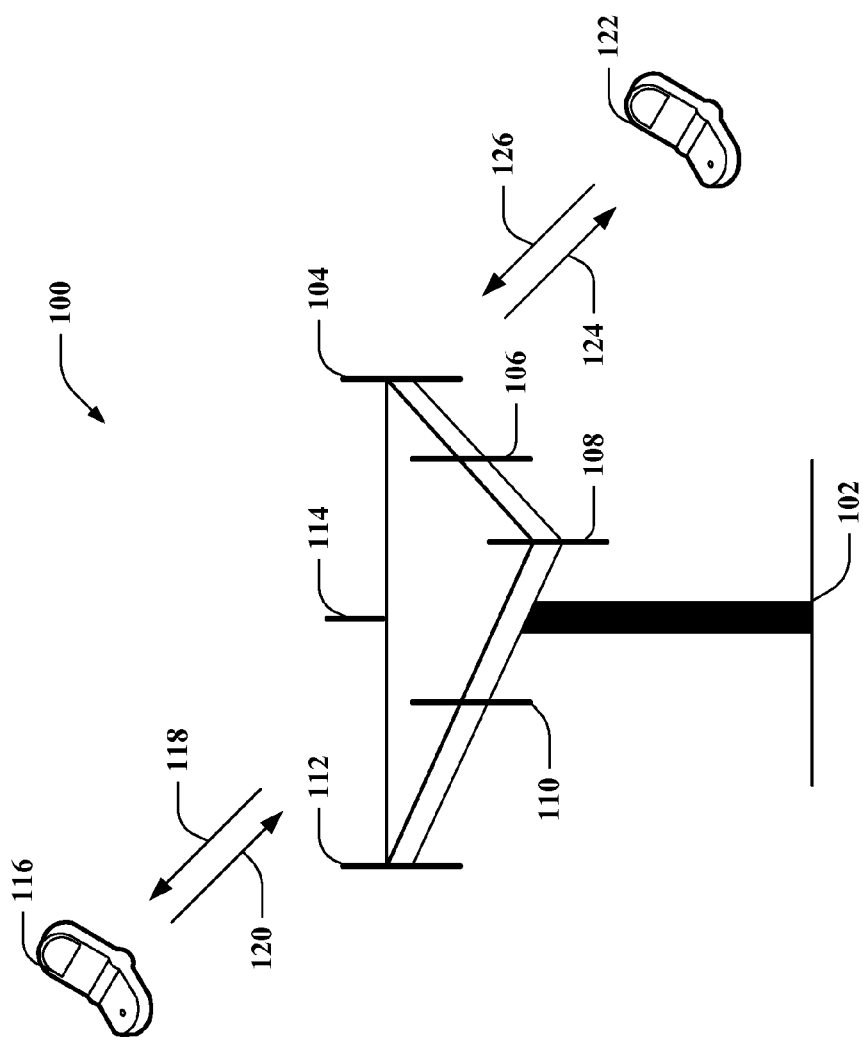
FIG. 1 is an illustration of an example wireless communication system for facilitating DRX in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiments may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software and/or software in execution. For example, a component can be, but is not limited to being, a process running on a processor, a processor, an object, an executable, a thread of execution, a program, and/or a computer. By way of illustration, both an application running on a computing device and/or the computing device can be a component. One or more components can reside within a process and/or thread of execution and a component can be localized on one computer and/or distributed between two or more computers. In addition, these components can execute from various computer-readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA) and/or other systems. The terms "system" and "network" are often used interchangeably. A CDMA system can implement a radio technology such as Universal Terrestrial Radio Access (UTRA), CDMA1220, etc. UTRA includes Wideband-CDMA (W-CDMA) and other variants of CDMA. CDMA1220 covers IS-1220, IS-95 and IS-856 standards. An OFDMA system can implement a radio technology such as Evolved UTRA (E-UTRA), Ultra Mobile Broadband (UMB), IEEE 122.11 (Wi-Fi), IEEE 122.16 (WiMAX), IEEE 122.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, CDMA1220 and UMB are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 122.xx wireless LAN, BLUETOOTH and any other short- or long-range, wireless communication techniques.

Single carrier frequency division multiple access (SC-FDMA) utilizes single carrier modulation and frequency domain equalization. SC-FDMA can have similar performance and essentially the same overall complexity as those of an OFDMA system. A SC-FDMA signal can have lower peak-to-average power ratio (PAPR) because of its inherent single carrier structure. SC-FDMA can be used, for instance, in uplink communications where lower PAPR greatly benefits UEs in terms of transmit power efficiency. Accordingly, SC-FDMA can be implemented as an uplink multiple access scheme in 3GPP Long Term Evolution (LTE) or Evolved UTRA.

Furthermore, various embodiments are described herein in connection with a UE. An UE can also be called a system, subscriber unit, subscriber station, mobile station, mobile, remote station, remote terminal, mobile device, user terminal, terminal, wireless communication device, user agent, user device or access terminal. An UE can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a BS. A BS can be utilized for communicating with UEs and can also be referred to as an access point, Node B, Evolved Node B (eNodeB, eNB) or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include, but are not limited to, magnetic storage devices (e.g., hard disk, floppy disk, magnetic strips), optical disks (e.g., compact disk (CD), digital versatile disk (DVD)), smart cards, and flash memory devices (e.g., EPROM, card, stick, key drive). Additionally, various storage media described herein can represent one or more devices and/or other machine-readable media for storing information. The term "machine-readable medium" can include, without being limited to, wireless channels and various other media capable of storing, containing, and/or carrying codes and/or instruction(s) and/or data.

Referring now to FIG. 1, a wireless communication system 100 is illustrated in accordance with various embodiments presented herein. System 100 includes a BS 102 that can include multiple antenna groups. For example, one antenna group can include antennas 104, 106, another group can comprise antennas 108, 110, and an additional group can include antennas 112, 114. Two antennas are illustrated for each antenna group; however, more or fewer antennas can be utilized for each group. BS 102 can additionally include a transmitter chain and a receiver chain, each of which can in turn comprise a plurality of components associated with signal transmission and reception (e.g., processors, modulators, multiplexers, demodulators, demultiplexers, antennas), as will be appreciated by one skilled in the art.

BS 102 can communicate with one or more UEs such as UE 116, 122. However, it is to be appreciated that BS 102 can communicate with substantially any number of UEs similar to UEs 116, 122. UEs 116, 122 can be, for example, cellular phones, smart phones, laptops, handheld communication devices, handheld computing devices, satellite radios, global positioning systems, PDAs, and/or any other suitable device for communicating over wireless communication system 100. As depicted, UE 116 is in communication with antennas 112, 114, where antennas 112, 114 transmit information to UE 116 over DL 118 and receive information from UE 116 over a UL 120. Moreover, UE 122 is in communication with antennas 104, 106, where antennas 104, 106 transmit information to UE 122 over a DL 124 and receive information from UE 122 over a UL 126. In a frequency division duplex (FDD) system, DL 118 can utilize a different frequency band than that used by UL 120, and DL 124 can employ a different frequency band than that employed by UL 126, for example. Further, in a time division duplex (TDD) system, DL 118 and UL 120 can utilize a common frequency band and DL 124 and UL 126 can utilize a common frequency band.

Each group of antennas and/or the area in which they are designated to communicate can be referred to as a sector of BS 102. For example, antenna groups can be designed to communicate to UEs in a sector of the areas covered by BS 102. In communication over DLs 118, 124, the transmitting antennas of BS 102 can utilize beamforming to improve signal-to-noise ratio of DLs 118, 124 for UEs 116, 122. Also, while BS 102 utilizes beamforming to transmit to UEs 116, 122 scattered randomly through an associated coverage, UEs 116, 122 in neighboring cells can be subject to less interference as compared to a BS transmitting through a single antenna to all its UEs.

Additionally, system 100 can facilitate DRX by providing DRX configuration information over UL 126 to UE 122 from BS 102. The DRX configuration information can be for controlling DRX based on time and frequency parameters. Embodiments of the UE 122 and BS 102, systems, methods, computer program products and means for facilitating DRX will be described in further detail below.

Figure 2:
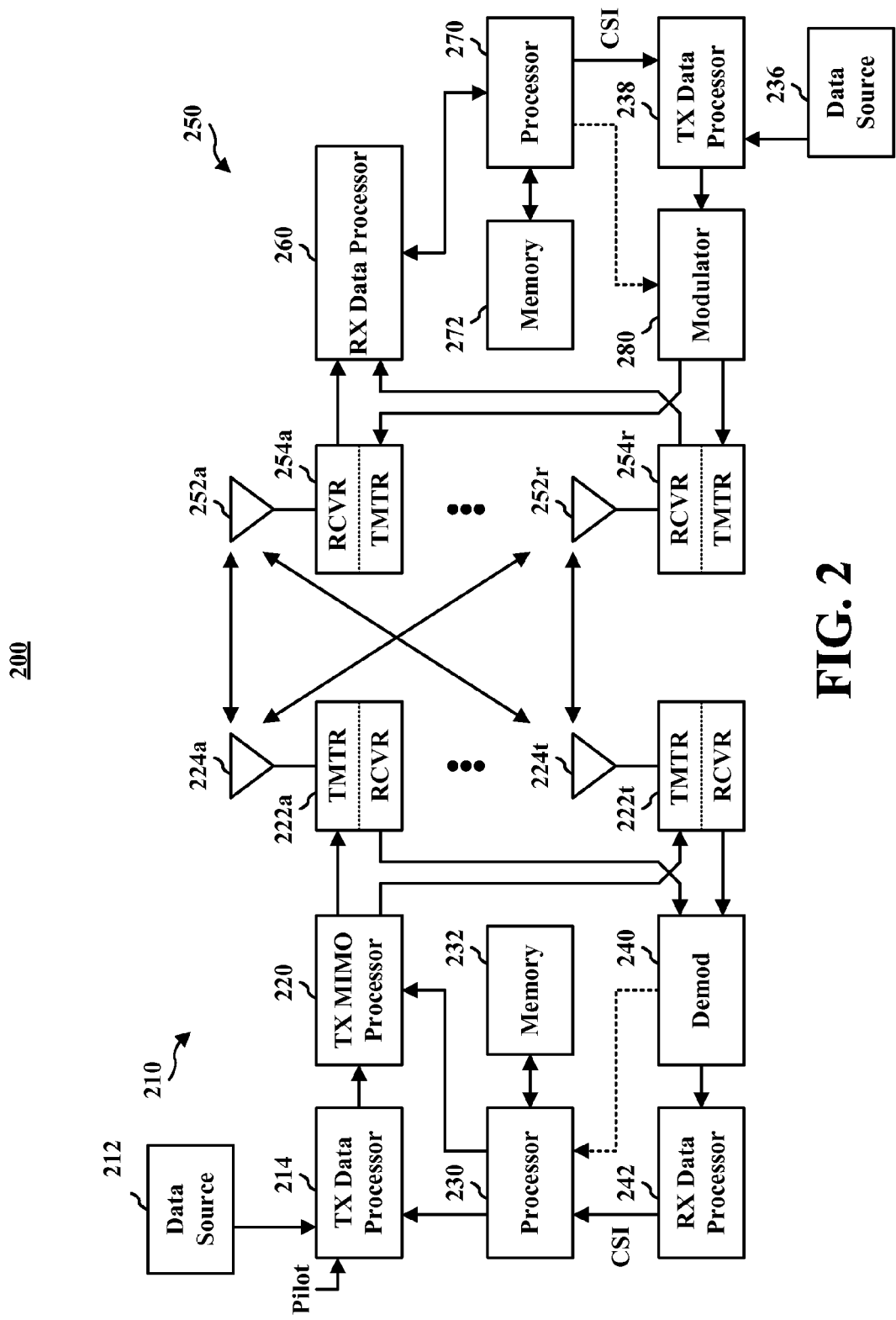
FIG. 2 is an illustration of an example wireless network environment for facilitating DRX in accordance with various aspects set forth herein.

FIG. 2 is an illustration of an example of a wireless network environment for facilitating DRX in accordance with various aspects set forth herein. The wireless communication system 200 depicts one BS 210 and one UE 250 for sake of brevity. However, it is to be appreciated that system 200 can include more than one BS and/or more than one UE, wherein additional BSs and/or UEs can be substantially similar or different from example BS 210 and UE 250 described below. In addition, it is to be appreciated that BS 210 and/or UE 250 can employ the methods (e.g., FIGS. 13-16), apparatus (e.g., FIGS. 6 and 7) and/or systems (e.g., FIGS. 1, 2, 3, 5 and 8-12) described below to facilitate DRX.

At BS 210, traffic data for a number of data streams is provided from a data source 212 to a transmit (TX) data processor 214. According to an example, each data stream can be transmitted over a respective antenna. TX data processor 214 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at UE 250 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM)) selected for that data stream to provide modulation symbols. The data rate, coding, and modulation for each data stream can be determined by instructions performed or provided by processor 230.

The modulation symbols for the data streams can be provided to a TX MIMO processor 220, which can further process the modulation symbols (e.g., for OFDM). TX MIMO processor 220 then provides $N_T$ modulation symbol streams to $N_T$ transmitters (TMTR) 222a through 222t. In various embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 222a through 222t are transmitted from $N_T$ antennas 224a through 224t, respectively.

At UE 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective signal, digitizes the conditioned signal to provide samples, and further processes the samples to provide a corresponding "received" symbol stream.

An RX data processor 260 can receive and process the $N_R$ received symbol streams from $N_R$ receivers 254 based on a particular receiver processing technique to provide $N_T$ "detected" symbol streams. RX data processor 260 can demodulate, deinterleave, and decode each detected symbol stream to recover the traffic data for the data stream. The processing by RX data processor 260 is complementary to that performed by TX MIMO processor 220 and TX data processor 214 at BS 210.

A processor 270 can periodically determine which available technology to utilize as discussed above. Further, processor 270 can formulate a reverse link message comprising a matrix index portion and a rank value portion.

The reverse link message can comprise various types of information regarding the communication link and/or the received data stream. The reverse link message can be processed by a TX data processor 238, which also receives traffic data for a number of data streams from a data source 236, modulated by a modulator 280, conditioned by transmitters 254a through 254r, and transmitted back to BS 210.

At BS 210, the modulated signals from UE 250 are received by antennas 224, conditioned by receivers 222, demodulated by a demodulator 240, and processed by a RX data processor 242 to extract the reverse link message transmitted by UE 250. Further, processor 230 can process the extracted message to determine which precoding matrix to use for determining the beamforming weights.

Processors 230 and 270 can direct (e.g., control, coordinate, manage) operation at BS 210 and UE 250, respectively. Respective processors 230 and 270 can be associated with memory 232 and 272 that store program codes and data. Processors 230 and 270 can also perform computations to derive frequency and impulse response estimates for the uplink and downlink, respectively.

In an aspect, logical channels can be classified into Control Channels and Traffic Channels. Logical Control Channels can include a Broadcast Control Channel (BCCH), which is a DL channel for broadcasting system control information. Further, Logical Control Channels can include a Paging Control Channel (PCCH), which is a DL channel that transfers paging information. Moreover, the Logical Control Channels can include a Multicast Control Channel (MCCH), which is a Point-to-multipoint DL channel used for transmitting Multimedia Broadcast and Multicast Service (MBMS) scheduling and control information for one or several Multicast Traffic Channels (MTCHs). Generally, after establishing a Radio Resource Control (RRC) connection, this channel is only used by UEs that receive MBMS (e.g., old MCCH+MSCH). Additionally, the Logical Control Channels can include a Dedicated Control Channel (DCCH), which is a Point-to-point bi-directional channel that transmits dedicated control information and can be used by UEs having a RRC connection. In an aspect, the Logical Traffic Channels can comprise a Dedicated Traffic Channel (DTCH), which is a Point-to-point bi-directional channel dedicated to one UE for the transfer of user information. Also, the Logical Traffic Channels can include an MTCH for Point-to-multipoint DL channel for transmitting traffic data.

In an aspect, Transport Channels are classified into DL and UL. DL Transport Channels can include a Broadcast Channel (BCH), a Downlink Shared Data Channel (DL-SDCH) and a Paging Channel (PCH). The PCH can support UE power saving (e.g., Discontinuous Reception (DRX) cycle can be indicated by the network to the UE) by being broadcasted over an entire cell and being mapped to Physical layer (PHY) resources that can be used for other control/traffic channels. The UL Transport Channels can comprise a Random Access Channel (RACH), a Request Channel (REQCH), an Uplink Shared Data Channel (UL-SDCH) and a plurality of PHY channels.

The PHY channels can include a set of DL channels and UL channels. For example, the DL PHY channels can include: Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); and/or Load Indicator Channel (LICH). By way of further illustration, the UL PHY Channels can include: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PSDCH); and/or Broadband Pilot Channel (BPICH).

Figure 3:
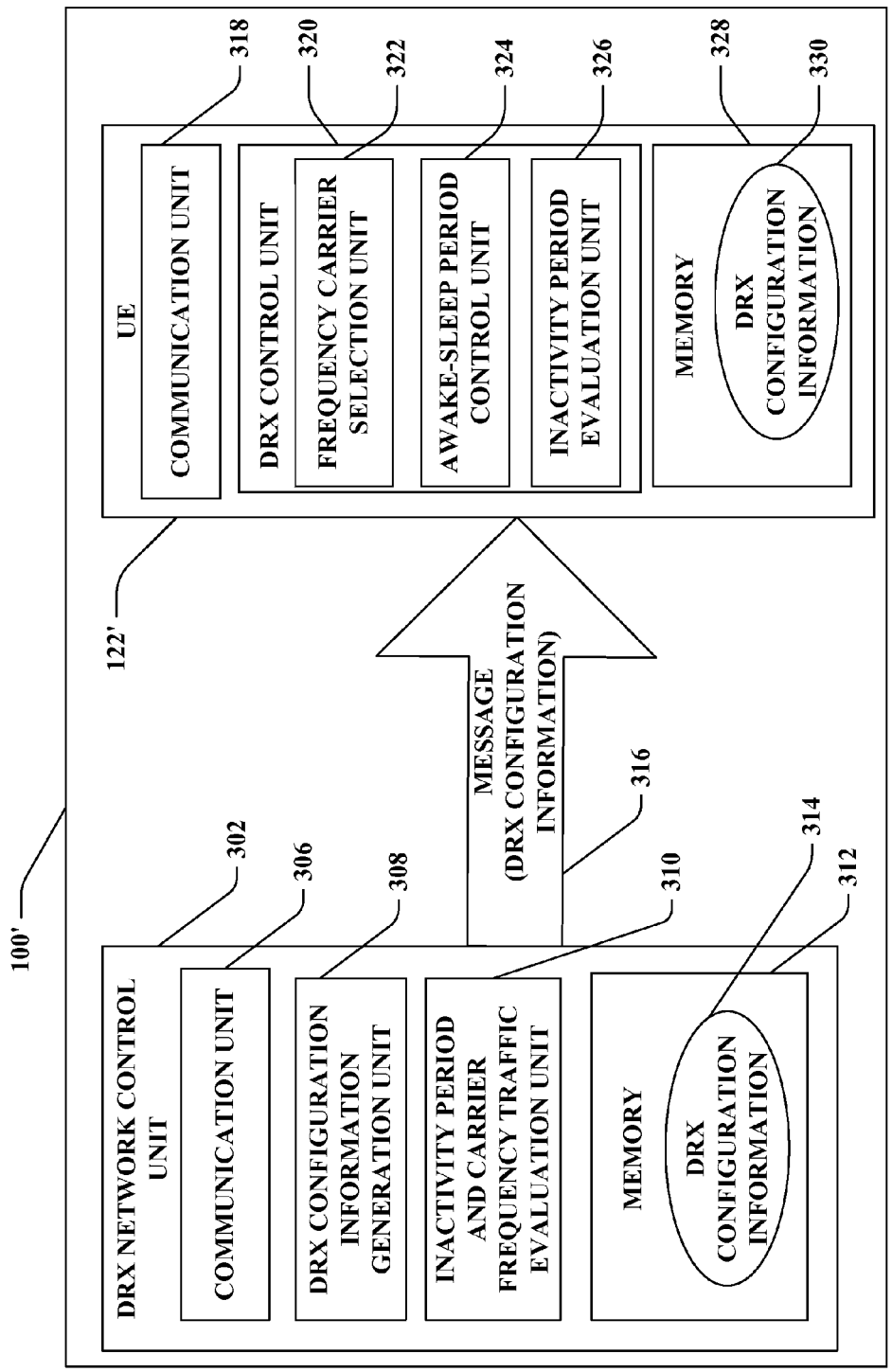
FIG. 3 illustrates an example of a block diagram of a system for facilitating DRX in accordance with various aspects set forth herein.

FIG. 3 illustrates an example of a block diagram of a system for facilitating DRX in accordance with various aspects set forth herein. The system 100' can include a DRX network control unit 302 and a UE 122' communicatively coupled to one another. As shown, the DRX network control unit 302 can transmit information to the UE 122', such as the message 316 including DRX configuration information shown in FIG. 3 and discussed in more detail below. While only one UE 122' is shown in FIG. 3, in other embodiments, any number of UEs (and/or UEs 122, 122", 122'", 122"" described herein) can receive information from the DRX network control unit 302. Further, while the UE 122' is shown and described, it is to be understood that the same or substantially similar structure and/or functionality of UE122' can be provided in UE 122 (described with reference to FIG. 1) and/or UE 122", 122'", 122"" (later-described with reference to FIGS. 5, 6, and 7, respectively).

Referring back to FIG. 3, the DRX network control unit 302 can be any hardware, software, or a combination thereof, adapted to generate DRX configuration information, based on time and frequency carrier information, for controlling the DRX operation of the UE 122'. In the embodiment shown, the DRX network control unit 302 can include a communication unit 306, a DRX configuration information generation unit 308, an inactivity period and carrier frequency traffic evaluation unit 310, and a memory 312 configured to store the DRX configuration information 314. One or more of the components of the DRX network control unit 302 can be communicatively coupled to one another for generating the message 316 transmitted to the UE 122'.

In the embodiment shown, the DRX configuration information generation unit 308 can be or include any hardware, software or combination thereof for generating DRX configuration information 314 for use by the UE 122'. The DRX configuration information 314 can include information indicative of parameters associated with both time and frequency. The time and frequency parameters can be associated with one another for controlling the DRX of the UE 122' on one or more frequency carriers based on inactivity periods of time at the UE 122'. As such, the one or more frequency carriers can be selected and can dynamically change based on the inactivity period. Further, there can be more than one inactivity period.

By way of example, but not limitation, the parameter associated with time can be the duration of the inactivity period at the UE 122'. By way of another example, but, again, not by limitation, the parameter associated with frequency can be the type or number of frequency carriers on which the UE 122' is to perform DRX. Accordingly, the DRX configuration information 314 can be indicative of two-dimensional information (that includes both time and frequency factors) based upon which the UE 122' will perform DRX. The DRX configuration information 314 can include multiple combinations of time and frequency DRX such that the DRX configuration information 314 can represent multiple levels of DRX at the UE 122'. By way of example, but not limitation, a first level of DRX can correspond to a first inactivity period and a corresponding first set of frequency carriers or types of frequency carriers while a second level of DRX can correspond to a second inactivity period and a corresponding second set of frequency carriers or types of frequency carriers.

In one embodiment, the DRX configuration information generation unit 308 can generate the DRX configuration information 314 by determining a length of an inactivity period that can occur at the UE 122'. The term "inactivity period" is used herein to mean "the length of time when data is not being received at the UE 122', and the UE 122' does not have data to transmit." The values representing the length of time for the inactivity period can be selected randomly by the DRX configuration information generation unit 308, based on information from the UE 122' and/or based on information from the multicarrier wireless communication system 100' in which the DRX network control unit 302 and the UE 122' operate.

The DRX configuration information generation unit 308 can determine a length of a DRX cycle that corresponds to the length of the inactivity period. The DRX cycle can include an awake period, during which the UE 122' can receive data, and a sleep period, during which the UE 122' cannot receive data. As such, to conserve the power expended by a battery (not shown) of the UE 122', the DRX cycle length can be chosen such that the DRX cycle length increases with an increase in an inactivity period, and decreases with a decrease in an inactivity period. In other embodiments, the length of the sleep period within the DRX cycle increases with an increase in an inactivity period, and decreases with a decrease in an inactivity period.

Figure 4:
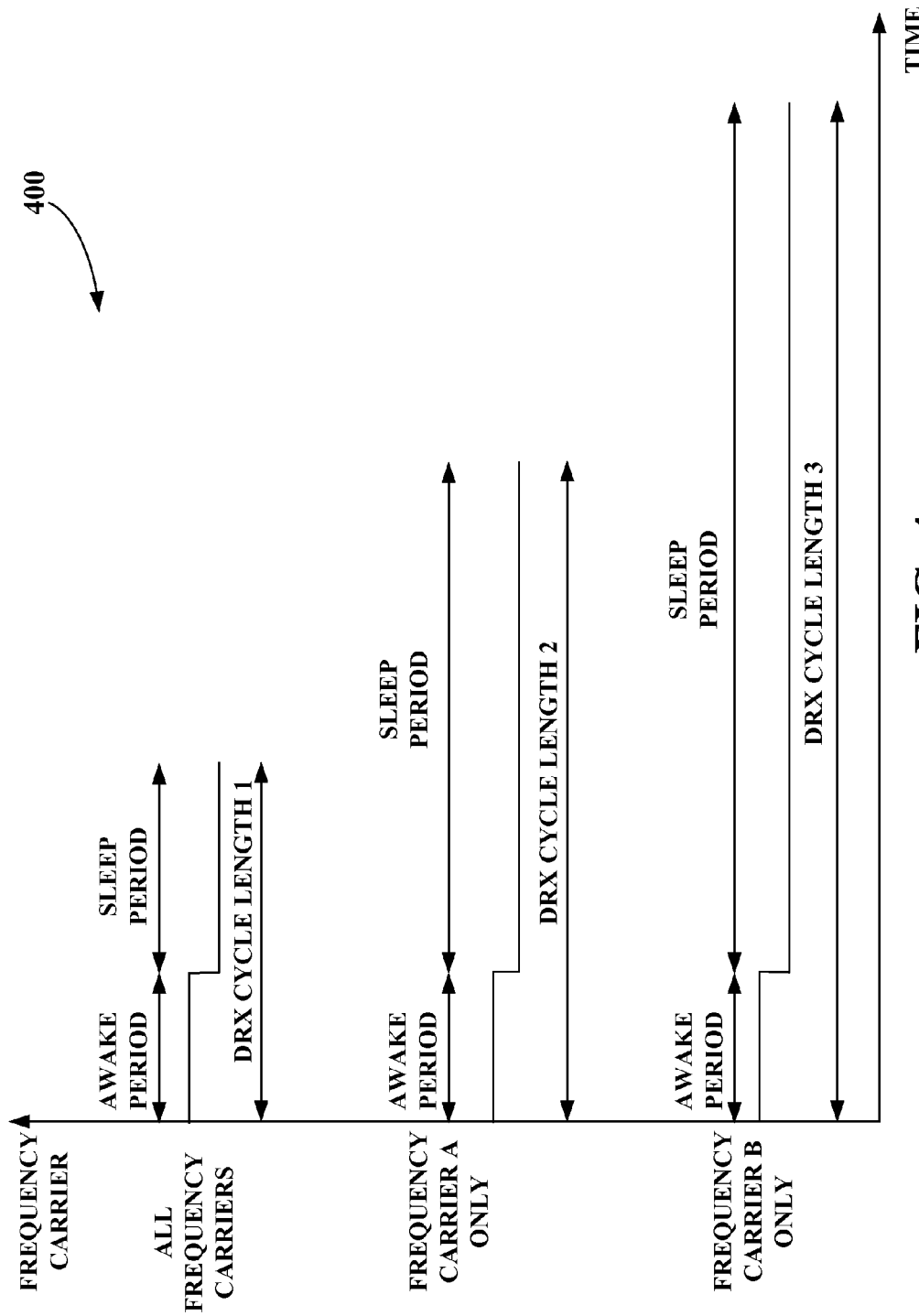
FIG. 4 illustrates an example of a graph displaying time and frequency aspects of levels of DRX in accordance with various aspects set forth herein.

FIG. 4 illustrates an example of a graph displaying time and frequency aspects of levels of DRX in accordance with various aspects set forth herein. While the description of FIG. 4 is provided with reference to FIG. 3 and corresponding UE 122', it is to be understood that the description can apply to UE 122 (as described with reference to FIG. 1) and/or UE 122'', 122''', 122'''' (as later-described with reference to FIGS. 5, 6 and 7, respectively).

As shown with reference to the Time axis, the DRX cycle lengths determined by the DRX configuration information generation unit 308, and which the UE 122' performs DRX in accordance with, can differ. The DRX cycle lengths can differ according to the inactivity periods determined by the DRX configuration information generation unit 308.

Referring back to FIG. 3, there can be any number of DRX cycle lengths respectively generated for a respective inactivity period. Accordingly, each inactivity period experienced at the UE 122' can cause the UE 122' to transition to a new state defined by new DRX operation. In some embodiments, more than one inactivity period can cause the UE 122' to transition to the same state.

The DRX configuration information generation unit 308 can also determine one or more frequency carriers on which the UE 122' will perform DRX for each of the determined DRX cycle lengths. In some embodiments, the inactivity period and carrier frequency traffic evaluation unit 310 can determine the one or more frequency carriers or the one or more inactivity periods and provide the information to the DRX configuration information generation unit 308.

In order to conserve battery life, in various embodiments, for a selected DRX cycle length, only one or a selected number (or a selected type) of frequency carriers are monitored by the UE 122' during the awake period of the DRX cycle. For example, instead of the UE 122' monitoring each of the frequency carriers on which it is configured to receive data, whenever the UE 122' is in the awake period, the UE 122' can monitor only a single frequency carrier.

In one embodiment, as the inactivity period increases, the DRX cycle in performed to monitor and receive data on fewer carriers. In such embodiment, for a first, very short, inactivity period, the DRX configuration information generation unit 308 can generate the DRX configuration information 314 such that the UE 122' monitors and is capable of receiving data on each of the frequency carriers. For a second inactivity period that is longer than the first inactivity period, the DRX configuration information generation unit 308 can generate the DRX configuration information 314 such that the UE 122' monitors and is capable of receiving data on only a single frequency carrier. For a third inactivity period that is longer than the second inactivity period, the DRX configuration information generation unit 308 can generate the DRX configuration information 314 such that the UE 122' monitors and is capable of receiving data also on only a single frequency carrier. The frequency carrier for the second inactivity period can differ or be the same as the frequency carrier for the third inactivity period. In one embodiment, the frequency carrier corresponding to the second inactivity period is determined to be the anchor carrier.

In some embodiments, the DRX configuration information generation unit 308 can generate the DRX configuration information 314 such that the UE 122' continuously monitors and/or receives data on the anchor carrier, and/or DRX is only performed on one or more of the non-anchor frequency carriers.

Again, referring to FIG. 4, an exemplary graph displaying time and frequency aspects of levels of DRX at UE 122' is shown. As shown with reference to the Frequency axis, the one or more frequency carriers that the DRX configuration information generation unit 308 determines for a DRX cycle length (which can correspond to an inactivity period), and which the UE 122' performs DRX in accordance with, can differ. Similarly, as discussed above, the type of frequency carrier (e.g., anchor carrier, non-anchor carrier) can also differ.

Tables 1-4 are exemplary relative values of inactivity periods, P, DRX cycle lengths, L and/or carriers, f, that can be embodied in the DRX configuration information 314, and by which the UE 122' can perform DRX. Table 1 illustrates DRX based on time parameters. While Tables 2, 3 and 4 are based on a combination of time and frequency parameters.

TABLE 1

Time-Based DRX

| Inactivity Period (P) | DRX Cycle Length (L) |
|---|---|
| $P_1$ | $L_1$ |
| $P_2$, where $P_2 > P_1$ | $L_2$, where $L_2 > L_1$ |
| $P_3$, where $P_3 > P_2$ | $L_3$, where $L_3 > L_2$ |

TABLE 2

Time- and Frequency-Based DRX (Single Frequency Carrier)

| Inactivity Period (P) | DRX Cycle Length (L) | Frequency Carrier (f) |
|---|---|---|
| $P_1$ | $L_1$ | $f_1$ |
| $P_2$, where $P_2 > P_1$ | $L_2$, where $L_2 > L_1$ | $f_1$ |
| $P_3$, where $P_3 > P_2$ | $L_3$, where $L_3 > L_2$ | $f_1$ |

TABLE 3

Time- and Frequency-Based DRX (Multiple Frequency Carriers, Specified by Frequency Carrier)

| Inactivity Period (P) | DRX Cycle Length (L) | Frequency Carrier (f) |
|---|---|---|
| $P_1$ | $L_1$ | $f_1$ |
| $P_2$, where $P_2 > P_1$ | $L_2$, where $L_2 > L_1$ | $f_3$ and $f_4$ |
| $P_3$, where $P_3 > P_2$ | $L_3$, where $L_3 > L_2$ | $f_2$ |

TABLE 4

Time- and Frequency-Based DRX (Multiple Frequency Carriers, Specified by Number of Frequency Carriers)

| Inactivity Period (P) | DRX Cycle Length (L) | Frequency Carrier (f) |
|---|---|---|
| $P_1$ | $L_1$ | 1 carrier |
| $P_2$, where $P_2 > P_1$ | $L_2$, where $L_2 > L_1$ | 2 carriers |
| $P_3$, where $P_3 > P_2$ | $L_3$, where $L_3 > L_2$ | 1 carrier |

Referring back to FIG. 3, the DRX configuration information 314 can be stored in the memory 312 and retrieved for re-transmission to the UE 122' in some embodiments. The communication unit 306 can transmit (or re-transmit) the DRX configuration information 314 to the UE 122'.

The UE 122' can be any hardware, software, or a combination thereof, adapted to receive DRX configuration information 314, based on time and frequency carrier information, and perform DRX operation on one or more frequency carriers based on the received DRX configuration information 314. In various embodiments, the UE 122' can be a mobile device, including, but not limited to, a cell phone, personal digital assistant (PDA) and/or a laptop. In some embodiments, the UE 122' can be a computer, facsimile machine, printer and/or copier.

In the embodiment shown, the UE 122' includes a communication unit 318, a DRX control unit 320, and a memory 328 configured to store the received DRX configuration information 330. In some embodiments, the received DRX configuration information 330 is the same as the DRX configuration information 314 generated by DRX configuration generation unit 308. The DRX control unit 322 can be any hardware, software, or a combination thereof, adapted to control the time- and frequency-based DRX operation of the UE 122' based on the DRX configuration information 314. In one embodiment, the DRX control unit 320 includes an inactivity period evaluation unit 326 configured to monitor and determine the length of the inactivity period experienced at the UE 122', an awake-sleep period control unit configured to determine the corresponding awake period and sleep period that should combine to create a DRX operation being or to be performed by the UE 122', and a frequency carrier selection unit 322 configured to cause the UE 122' to select various frequency carriers to monitor and receive data according to the DRX operation of the UE 122'. Accordingly, the DRX control unit 320 controls the DRX operation of the UE 122' according to the DRX configuration information 314 received from the DRX network control unit 302.

Figure 5:
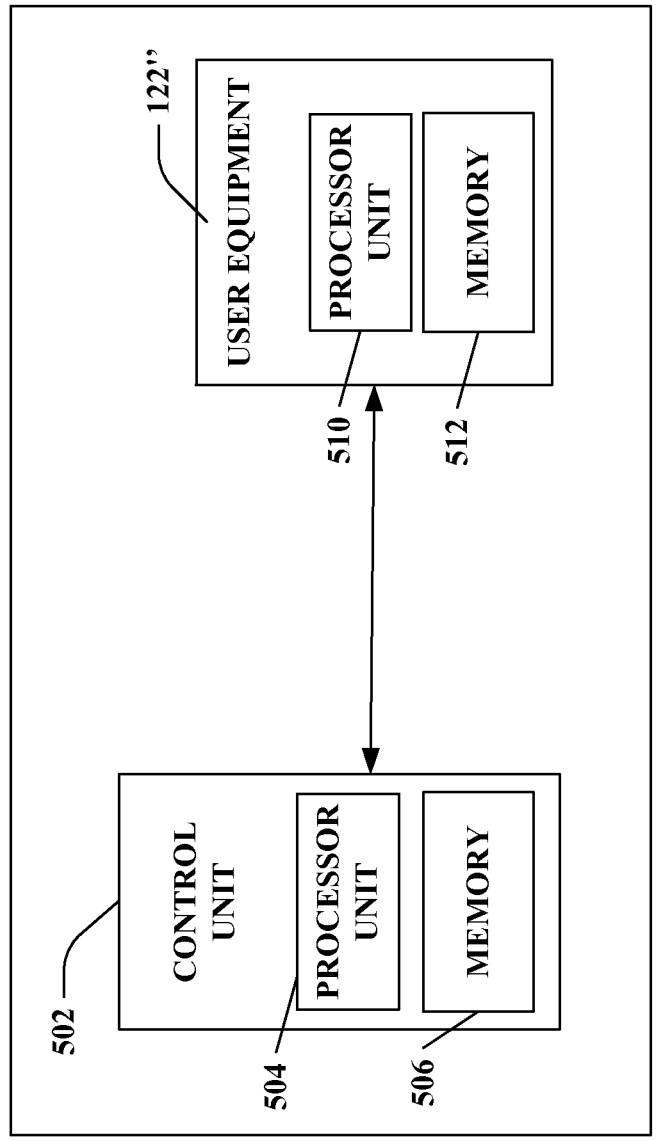
FIG. 5 illustrates another example of a block diagram of a system for facilitating DRX in accordance with various aspects set forth herein.

FIG. 5 illustrates another example of a block diagram of a system for facilitating DRX in accordance with various aspects set forth herein. The system 100'' can include a control unit 502 having a processor unit 504 and memory 506; and UE 122'' having a processor unit 510 and memory 412.

In some embodiments, the control unit 502 can be configured to generate DRX control information based on time and frequency parameters and output the generated DRX control information. The DRX control information can correspond to a plurality of levels of DRX.

The UE 122'' can be capable of performing multicarrier reception of data. The UE 122'' can be communicatively coupled to the control unit 502, and configured to: receive the output DRX control information. The UE 122'' can also be configured to perform DRX, on one or more frequency carriers on which the UE 122'' can be configured to perform multicarrier reception according to one of the plurality of levels of DRX.

In some embodiments, control unit 502 is a BS. The BS can be the BS 102 described with reference to FIG. 1. In some embodiments, control unit 502 is a DRX network control unit 302 described with reference to FIG. 3. In some embodiments, the UE 122'' can be further configured to perform continuous reception on a selected frequency carrier during a time interval over which the UE 122'' performs DRX. The selected frequency carrier can be an anchor carrier.

Figure 6:
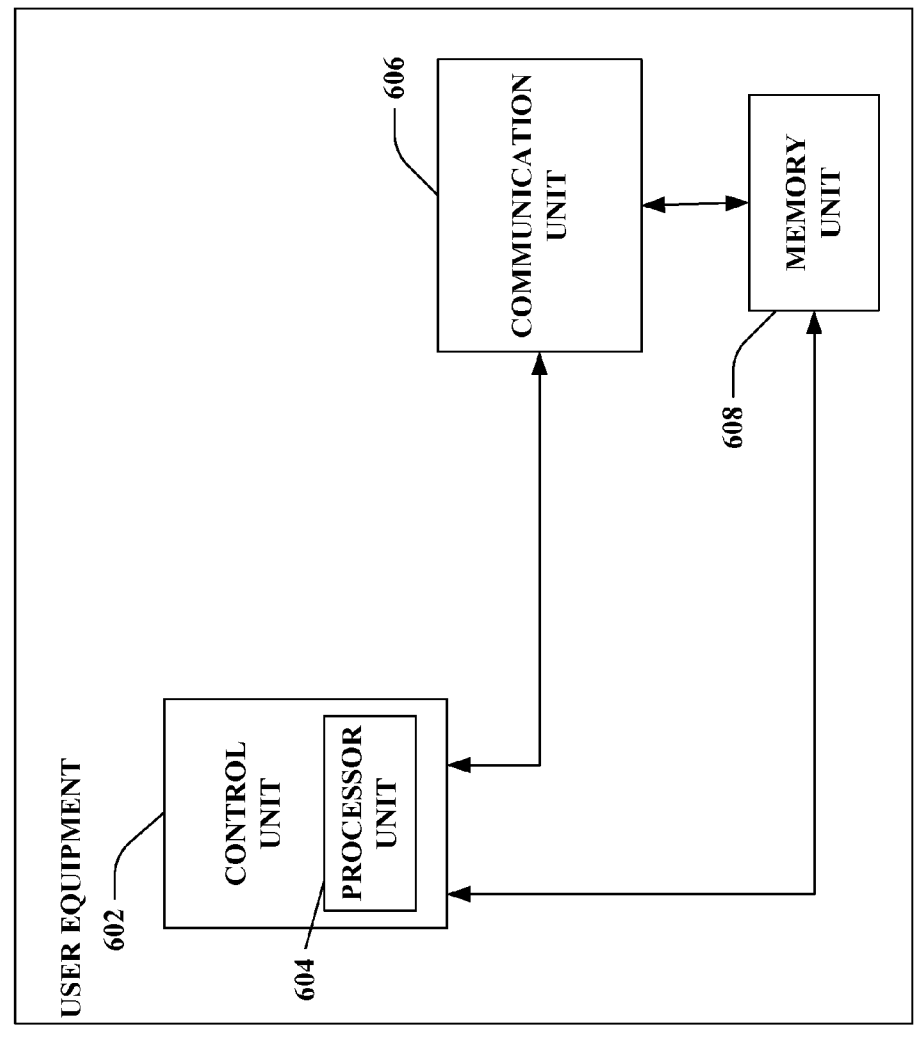
FIG. 6 illustrates an example of a block diagram of UE for facilitating DRX in accordance with various aspects set forth herein.

FIG. 6 illustrates an example of a block diagram of UE for facilitating DRX in accordance with various aspects set forth herein. The UE 122''' can include a control unit 602 including a processor unit 604; and a memory unit 608. In some embodiments, the UE 122''' can also include a communication unit 606. In various embodiments, one or more of the aforementioned units can be communicatively coupled for facilitating DRX.

In some embodiments, the control unit 602 can be configured for performing DRX based, at least, on parameters indicative of: one or more inactivity periods of the apparatus; and one or more sets of frequency carriers at which the apparatus is configured to monitor and receive data. The control unit 602 can also be configured for, after a first one of the one or more inactivity periods, operating in a first state corresponding to monitoring a first one of the one or more sets of frequency carriers; and, after a second one of the one or more inactivity periods, operating in a second state corresponding to monitoring a second one of the one or more sets of frequency carriers.

In some embodiments, the control unit 602 can also be configured for performing continuous reception on a frequency carrier corresponding to an anchor carrier of the UE 122''''. In some embodiments, the communication unit 606 can be configured for receiving DRX configuration information generated at a network control unit (not shown) communicatively coupled to the control unit 602. In some embodiments, the network control unit can be a BS 102 described with reference to FIG. 1 or the DRX network control unit 302 described with reference to FIG. 3.

Figure 7:
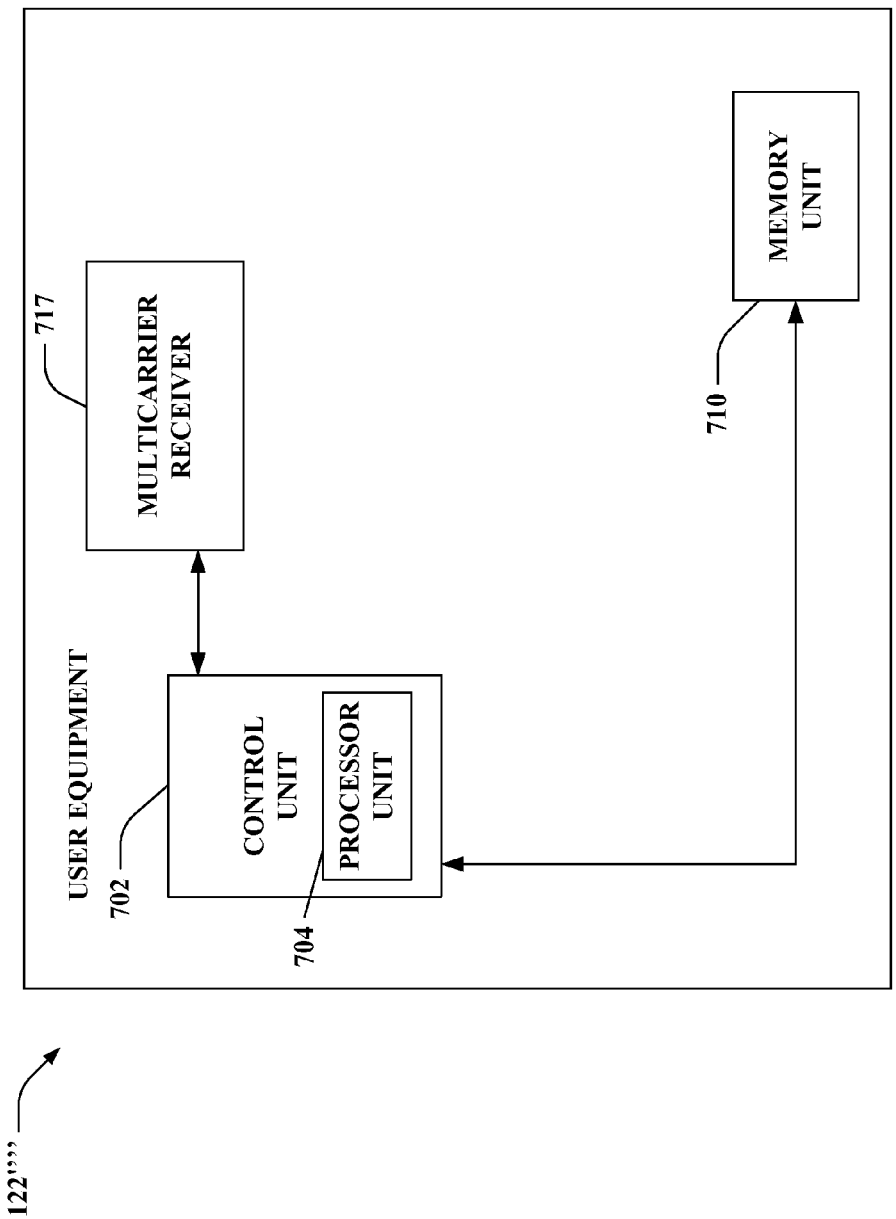
FIG. 7 illustrates another example of a block diagram of UE for facilitating DRX in accordance with various aspects set forth herein.

FIG. 7 illustrates another example of a block diagram of UE for facilitating DRX in accordance with various aspects set forth herein. The UE 122'''' can include a control unit 702 including a processor unit 704; a multicarrier receiver 717; and a memory unit 710. In various embodiments, one or more of the aforementioned units can be communicatively coupled for facilitating DRX.

The multicarrier receiver 717 can be configured for concurrently receiving data on selected one or more frequency carriers after a selected inactivity period of the multicarrier receiver 717. The receiving of the data can be based on DRX configuration information including parameters indicative of the selected one or more frequency carriers and indicative of the selected inactivity period of the multicarrier receiver 717.

FIGS. 8-12 each illustrate an example of a block diagram of a system for facilitating DRX in accordance with various aspects set forth herein.

Figure 8:
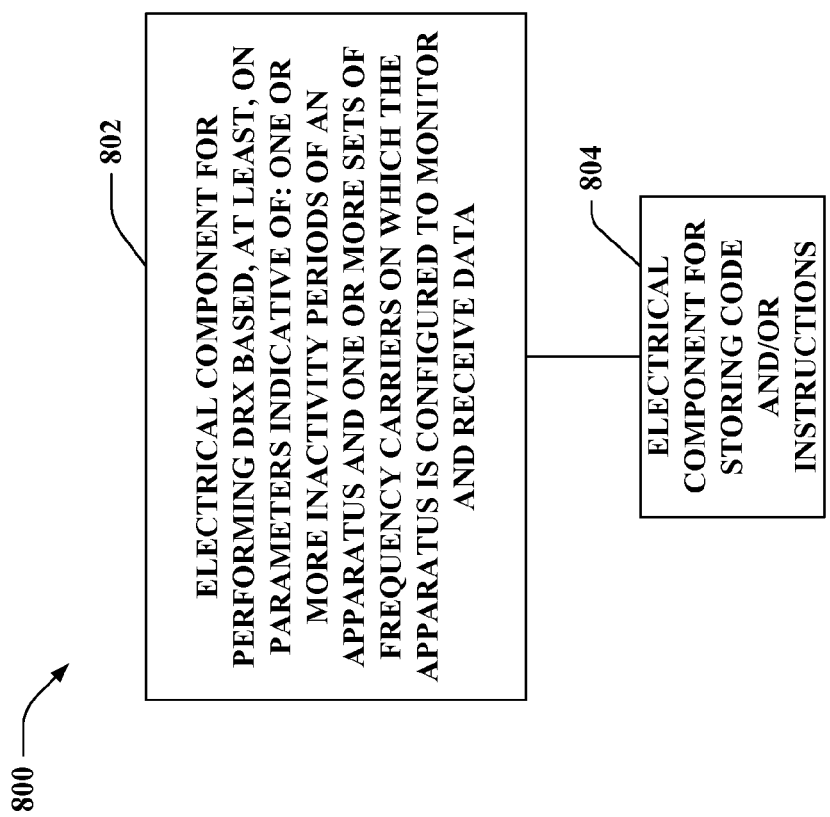
FIGS. 8-12 each illustrate an example of a block diagram of a system for facilitating DRX in accordance with various aspects set forth herein.

Turning to FIG. 8, illustrated is a system that facilitates DRX. For example, system 800 can reside within a UE, including, but not limited to, the UE 122, 122', 122'', 122''', 122'''' described with reference to FIGS. 1, 3, 5, 6 and 7, respectively. It is to be appreciated that system 800 is represented as including functional blocks, which can be functional blocks that represent functions implemented by a processor, hardware, software, firmware, or combination thereof. System 800 can include an electrical component 802 for performing DRX based, at least, on parameters indicative of: one or more inactivity periods of the apparatus; and one or more sets of frequency carriers at which the apparatus is configured to monitor and receive data. In some embodiments, the electrical component 802 can also be for, after a first one of the one or more inactivity periods, operating in a first state corresponding to monitoring a first one of the one or more sets of frequency carriers and, after a second one of the one or more inactivity periods, operating in a second state corresponding to monitoring a second one of the one or more sets of frequency carriers.

In some embodiments, the electrical component 802 can also be for performing continuous reception on a frequency carrier corresponding to an anchor carrier of the apparatus.

In some embodiments, the electrical component 802 can also include an electrical component for communicating (not shown). The electrical component for communicating can be for receiving DRX configuration information generated at an electrical component for controlling DRX (not shown) communicatively coupled to the electrical component 802 for DRX.

In some embodiments, the electrical component 802 can include, but is not limited to, a receiver, transceiver, the UE 122, 122', 122'', 122''', 122'''' described with reference to FIGS. 1, 3, 5, 6 and 7, respectively, the communication unit 606 described with reference to FIG. 6 or the multicarrier receiver 717 described with reference to FIG. 7.

Additionally, the system 800 can include an electrical component 804 for storing code and/or instructions for executing functions associated with electrical component 802. The electrical component 804 can include, but is not limited to, a memory, a computer-readable medium and/or the memory 312, 328 described with reference to FIG. 3, the memory 506, 512 described with reference to FIG. 5, the memory unit 608 described with reference to FIG. 6 and/or the memory unit 710 described with reference to FIG. 7. While shown as being external to the electrical component for storing 804, it is to be understood that electrical component 802 can be included within the electrical component for storing 804.

Figure 9:
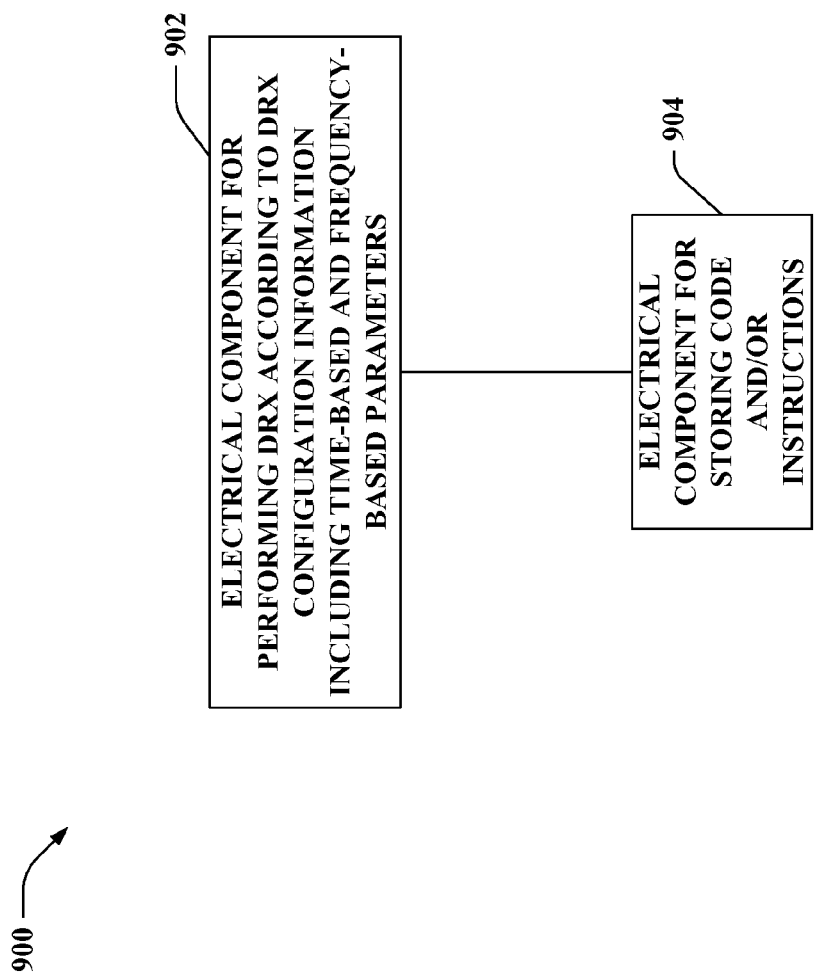

Turning to FIG. 9, illustrated is a system that facilitates DRX. For example, system 900 can reside within a UE, including, but not limited to, the UE 122, 122', 122'', 122''', 122'''' described with reference to FIGS. 1, 3, 5, 6 and 7, respectively. It is to be appreciated that system 900 is represented as including functional blocks, which can be functional blocks that represent functions implemented by a processor, hardware, software, firmware, or combination thereof. System 900 can include an electrical component 902 for performing DRX according to DRX configuration information that included time-based and frequency-based parameters. In some embodiments, the electrical component 902 can include, but is not limited to, a receiver, transceiver, the UE 122, 122', 122'', 122''', 122'''' described with reference to FIGS. 1, 3, 5, 6 and 7, respectively, the communication unit 606 described with reference to FIG. 6 or the multicarrier receiver 717 described with reference to FIG. 7.

Additionally, the system 900 can include an electrical component 904 for storing code and/or instructions for executing functions associated with electrical component 902. The electrical component 904 can include, but is not limited to, a memory, a computer-readable medium and/or the memory 312, 328 described with reference to FIG. 3, the memory 506, 512 described with reference to FIG. 5, the memory unit 608 described with reference to FIG. 6 and/or the memory unit 710 described with reference to FIG. 7. While shown as being external to the electrical component for storing 904, it is to be understood that electrical component 902 can be included within the electrical component for storing 904.

Figure 10:
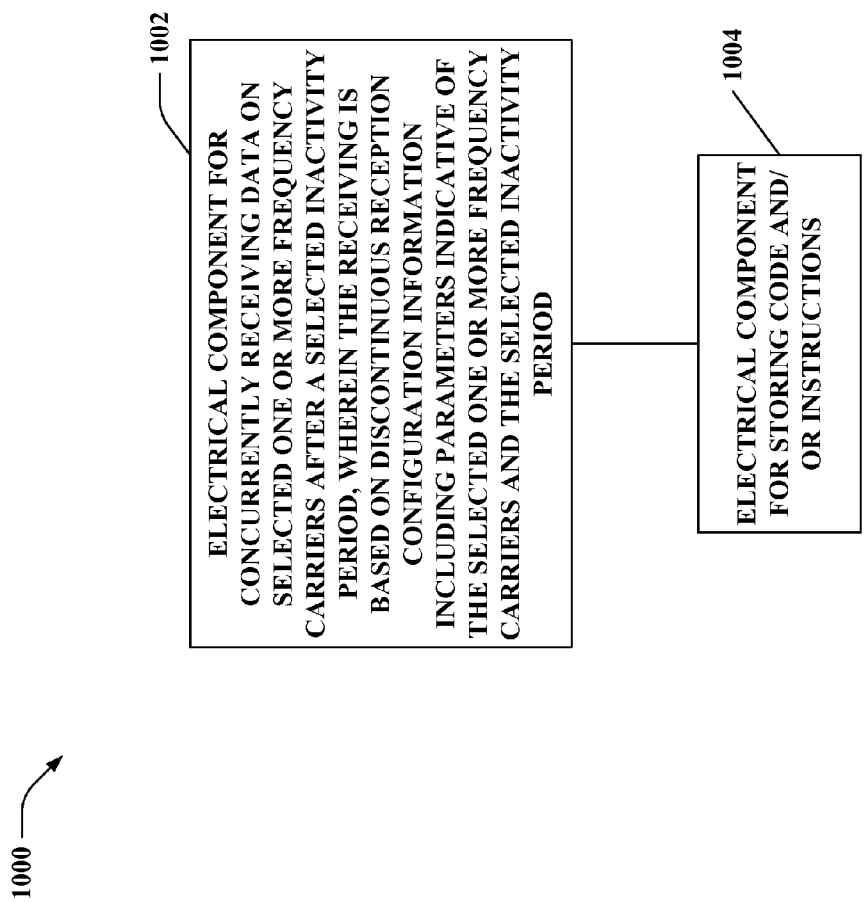

Turning to FIG. 10, illustrated is a system that facilitates DRX. For example, system 1000 can reside within a UE, including, but not limited to, the UE 122, 122', 122'', 122''', 122'''' described with reference to FIGS. 1, 3, 5, 6 and 7, respectively. It is to be appreciated that system 1000 is represented as including functional blocks, which can be functional blocks that represent functions implemented by a processor, hardware, software, firmware, or combination thereof. System 1000 can include an electrical component 1002 for concurrently receiving data on selected one or more frequency carriers after a selected inactivity period of the electrical component for concurrently receiving. The receiving can be based on DRX configuration information including parameters indicative of the selected one or more frequency carriers and indicative of the selected inactivity period of the electrical component 1002 for concurrently receiving. In some embodiments, the electrical component 1002 for concurrently receiving can include, but is not limited to, a receiver, transceiver, the UE 122, 122', 122'', 122''', 122'''' described with reference to FIGS. 1, 3, 5, 6 and 7, respectively, the communication unit 606 described with reference to FIG. 6 or the multicarrier receiver 717 described with reference to FIG. 7.

Additionally, the system 1000 can include an electrical component 1004 for storing code and/or instructions for executing functions associated with electrical component 1002. The electrical component 1004 can include, but is not limited to, a memory, a computer-readable medium and/or the memory 312, 328 described with reference to FIG. 3, the memory 506, 512 described with reference to FIG. 5, the memory unit 608 described with reference to FIG. 6 and/or the memory unit 710 described with reference to FIG. 7. While shown as being external to the electrical component for storing 1104, it is to be understood that electrical component 1002 can be included within the electrical component for storing 1004.

Figure 11:
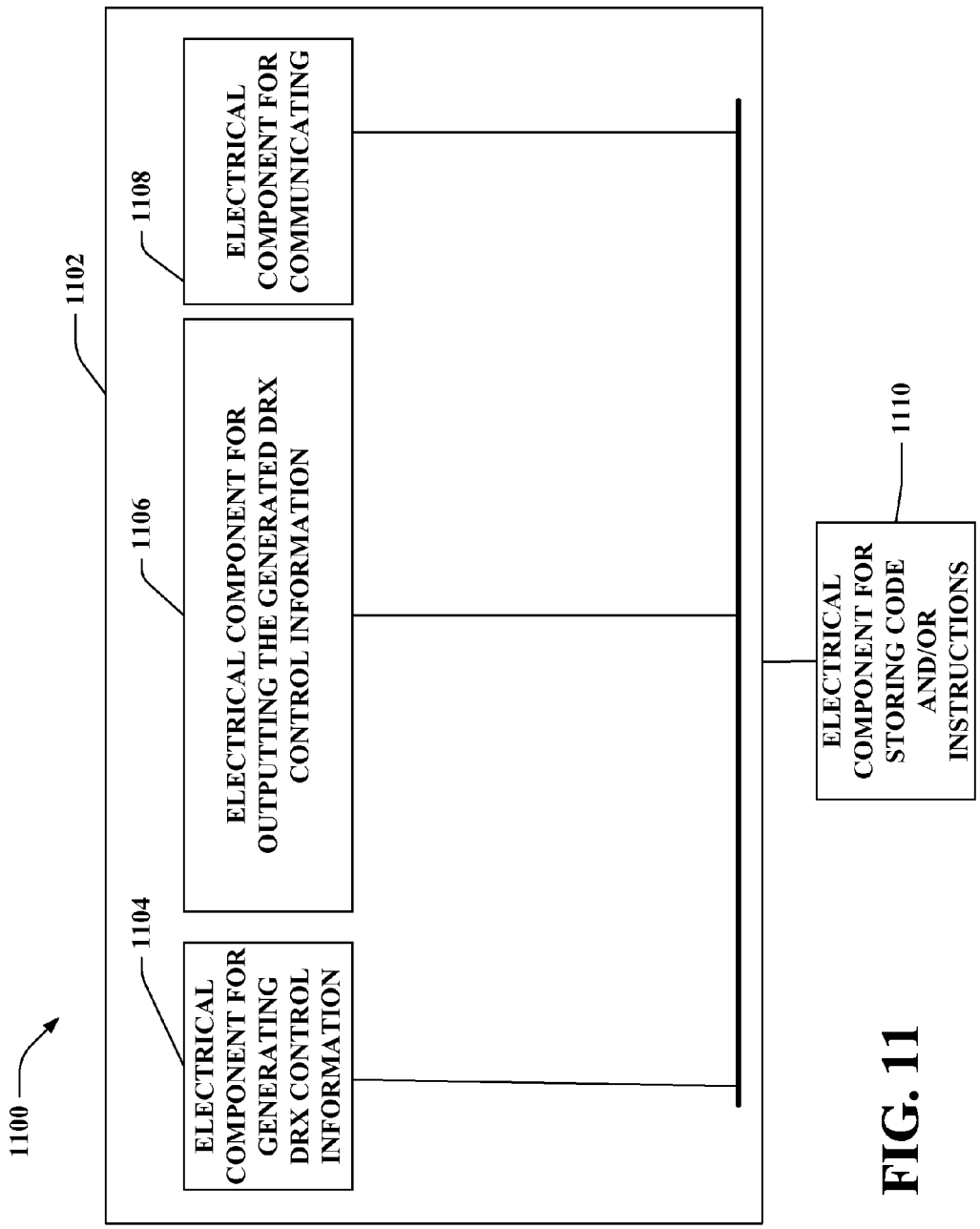

Turning to FIG. 11, illustrated is a system that facilitates DRX. For example, system 1100 can reside within a UE, including, but not limited to, the UE 122, 122', 122'', 122''', 122'''' described with reference to FIGS. 1, 3, 5, 6 and 7, respectively. It is to be appreciated that system 1100 is represented as including functional blocks, which can be functional blocks that represent functions implemented by a processor, hardware, software, firmware, or combination thereof. System 1100 can include a logical grouping 1102 of electrical components that can act in conjunction.

For instance, logical grouping 1102 can include an electrical component for generating DRX control information based on time and frequency parameters. The generated DRX control information can correspond to a plurality of levels of DRX 1104. In some embodiments, the electrical component for generating DRX control information 1104 can include, but is not limited to, BS 102 described with reference to FIG. 1, DRX network control unit 302 described with reference to FIG. 3 or control unit 502 described with reference to FIG. 5.

Further, logical grouping 1102 can include an electrical component for outputting the generated DRX control information 1106. In some embodiments, the electrical component 1106 can include, but is not limited to, a transmitter, transceiver or communication unit 306 described with reference to FIG. 3.

Moreover, logical grouping 1102 can include an electrical component for communicating 1108. The electrical component for communicating 1104 can be capable of performing multicarrier reception of data. The electrical component for communicating can be communicatively coupled to the means for generating 1104 DRX control information. The electrical component for communicating 1104 can be configured to receive the output DRX control information from the electrical component for outputting 1106. The electrical component for communicating 1104 can also be configured to perform DRX on one or more frequency carriers on which the electrical component for communicating 1104 is configured to perform multicarrier reception according to one of the plurality of levels of DRX. The selected frequency carrier can be an anchor carrier.

In some embodiments, the electrical component for communicating 1104 can be further configured to perform continuous reception on a selected frequency carrier during a time interval over which the electrical component for communicating 1104 performs DRX.

In some embodiments, the electrical component for communicating 1108 can include, but is not limited to, a receiver, transceiver or the UE 122, 122', 122'', 122''', 122'''' described with reference to FIGS. 1, 3, 5, 6 and 7, respectively, or the communication unit 606 described with reference to FIG. 6.

Additionally, the system 1100 can include an electrical component 1110 for storing code and/or instructions for executing functions associated with electrical components 1104, 1106 and/or 1108. The electrical component 1110 can include, but is not limited to, a memory, a computer-readable medium and/or the memory 312, 328 described with reference to FIG. 3, the memory 506, 512 described with reference to FIG. 5, the memory unit 608 described with reference to FIG. 6 and/or the memory unit 710 described with reference to FIG. 7. While shown as being external to the electrical component for storing 1114, it is to be understood that one or more of electrical components 1104, 1106 and/or 1108 can be included within the electrical component for storing 1110.

Figure 12:
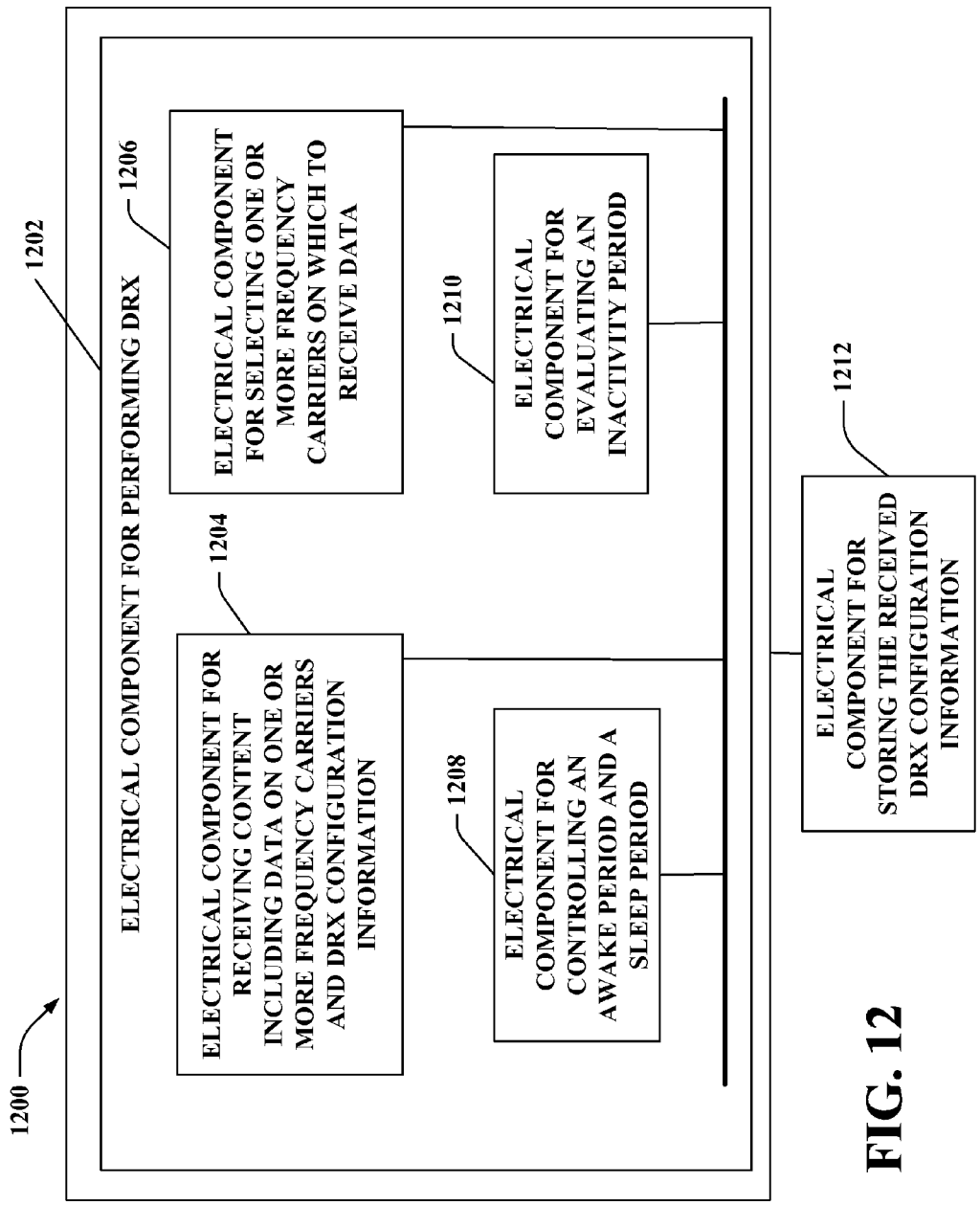

Turning to FIG. 12, illustrated is a system that facilitates DRX. For example, system 1200 can reside within a UE, including, but not limited to, the UE 122, 122', 122'', 122''', 122'''' described with reference to FIGS. 1, 3, 5, 6 and 7, respectively. It is to be appreciated that system 1200 is represented as including functional blocks, which can be functional blocks that represent functions implemented by a processor, hardware, software, firmware, or combination thereof. System 1200 can include a logical or physical grouping 1202 of electrical components for performing DRX. The electrical component can act in conjunction. For instance, logical or physical grouping 1202 can include an electrical component for receiving content 1204. The electrical component for receiving content 1204 can be for receiving data on one or more frequency carriers and for receiving DRX configuration information. In some embodiments, the electrical component for electrical component for receiving content 1204 can include, but is not limited to, a receiver, transceiver or the UE 122, 122', 122'', 122''', 122'''' described with reference to FIGS. 1, 3, 5, 6 and 7, respectively, the communication unit 606 described with reference to FIG. 6 or the multicarrier receiver 717 described with reference to FIG. 7.

Further, logical or physical grouping 1202 can include an electrical component for selecting one or more frequency carriers on which to receive the data 1206. In some embodiments, the electrical component 1206 can include, but is not limited to, the frequency carrier selection unit 322 described with reference to FIG. 3, the UE 122, 122', 122'', 122''', 122'''' described with reference to FIGS. 1, 3, 5, 6 and 7, respectively, the communication unit 606 described with reference to FIG. 6 or the multicarrier receiver 717 described with reference to FIG. 7.

Further, logical or physical grouping 1202 can include an electrical component 1208 for controlling an awake period and a sleep period of the logical or physical grouping 1202. In some embodiments, the electrical component 1208 can include, but is not limited to, the awake-sleep period control unit 324 described with reference to FIG. 3, the UE 122 described with reference to FIG. 1, 2, 3 or 5 or the communication unit 606 described with reference to FIG. 6.

Further, logical or physical grouping 1202 can include an electrical component 1210 for evaluating an inactivity period of the logical or physical grouping 1202. In some embodiments, the electrical component 1210 can include, but is not limited to, the inactivity period described with reference to FIG. 3, the UE 122, 122', 122'', 122''', 122'''' described with reference to FIGS. 1, 3, 5, 6 and 7, respectively, or the communication unit 606 described with reference to FIG. 6.

Additionally, the system 1200 can include an electrical component 1212 for storing received DRX configuration information, code and/or instructions, for executing functions associated with logical or physical grouping 1202 and/or electrical components 1204, 1206, 1208 and/or 1210. The electrical component 1212 can include, but is not limited to, a memory, a computer-readable medium and/or the memory 312, 328 described with reference to FIG. 3, the memory 506, 512 described with reference to FIG. 5, the memory unit 608 described with reference to FIG. 6 and/or the memory unit 710 described with reference to FIG. 7. While shown as being external to the electrical component for storing 1114, it is to be understood that one or more of electrical components 1204, 1206, 1208 and/or 1210 can be included within the electrical component for storing 1212.

In some embodiments, the DRX configuration information can include information indicative of an inactivity period and a corresponding one or more frequency carriers for receiving the information at the electrical component for receiving content 1204. In some embodiments, the electrical component for receiving content 1204 can be UE communicatively coupled to a BS for receiving the data and for receiving the DRX configuration information.

Figure 13:
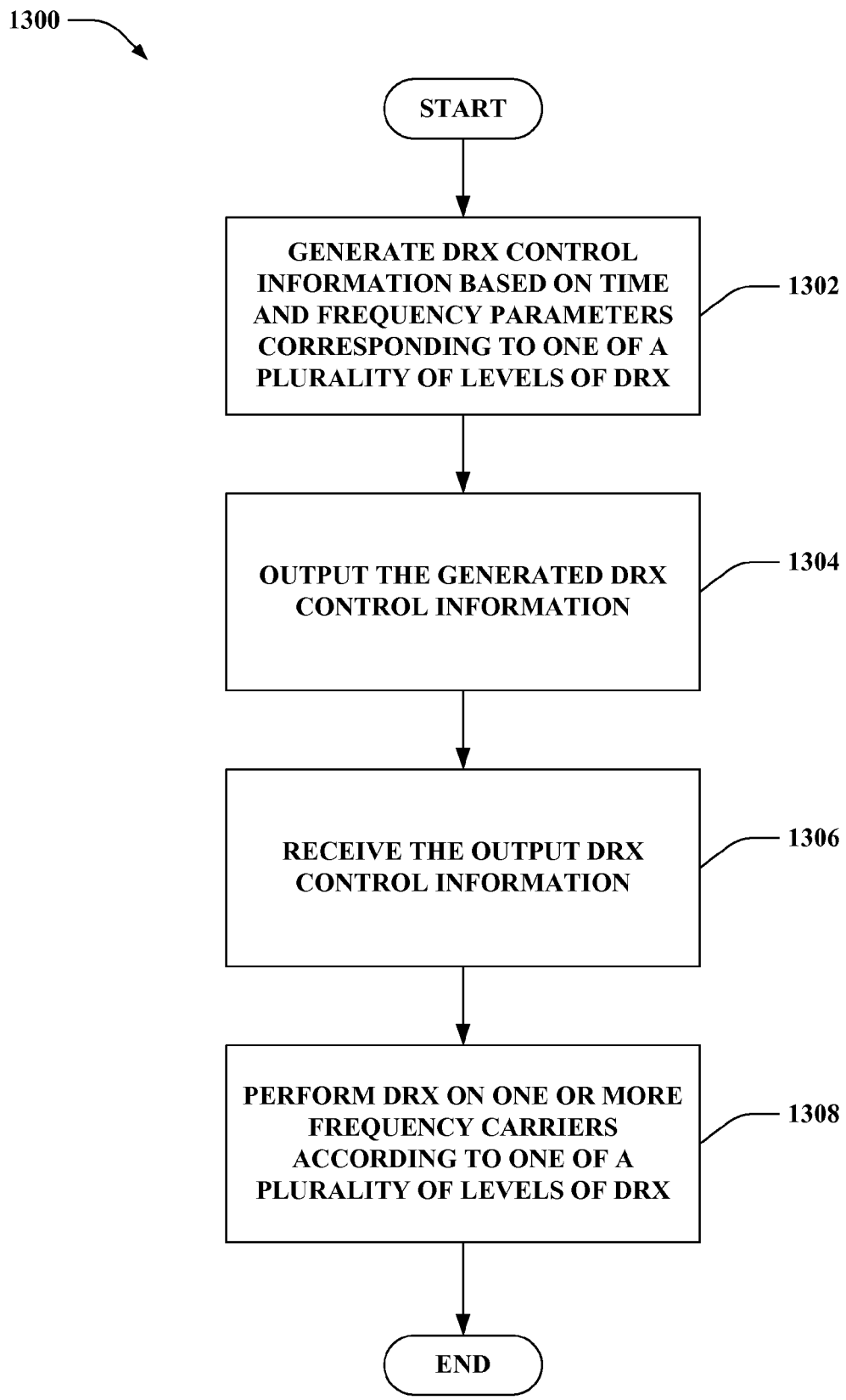
FIGS. 13-16 each illustrate an example of a method for facilitating DRX in accordance with various aspects set forth herein.

FIGS. 13-16 each illustrate an example of a method for facilitating DRX in accordance with various aspects set forth herein. Turning to FIG. 13, a method 1300 that facilitates DRX is provided. The method 1300 can include generating, at a first apparatus, DRX control information based on time and frequency parameters 1302. The generated DRX control information can correspond to a plurality of levels of DRX. The method 1300 can also include: outputting the generated DRX control information 1304; and receiving, at a second apparatus capable of performing multicarrier reception of data, the output DRX control information 1306. The method 1300 can also include performing DRX, on one or more frequency carriers on which the second apparatus is configured to perform multicarrier reception according to one of the plurality of levels of DRX 1308.

Figure 14:
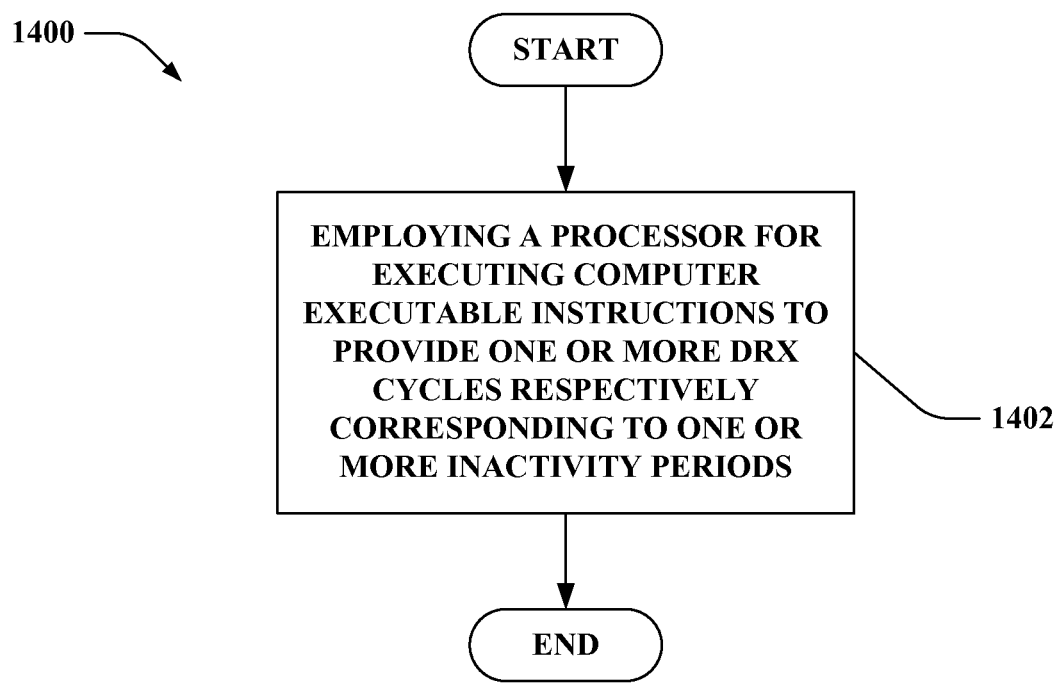

Turning to FIG. 14, a method 1400 that facilitates DRX is provided. The method can include employing a processor for executing computer executable instructions to provide one or more DRX cycles respectively corresponding to one or more inactivity periods 1402. During respective awake periods of the one or more DRX cycles, data can be received on respective ones of one or more frequency carriers. In some embodiments, the respective ones of one or more frequency carriers can be anchor or non-anchor carriers.

The one or more DRX cycles can include a first DRX cycle and a second DRX cycle, and the one or more inactivity periods can include a first inactivity period and a second inactivity period. In some embodiments, the first inactivity period can be shorter than the second inactivity period.

In some embodiments, a length of an inactivity period can be a multiple of a length of another inactivity period. By way of example, but not limitation, a length of the second inactivity period can be a multiple of a length of the first inactivity period (or vice versa).

In some embodiments, the inactivity period for each frequency carrier can increase or decrease based on the activity on the frequency carrier. Activity can be considered to be on a frequency carrier if there is data flow on the frequency carrier. By way of example, but not limitation, the inactivity period for each frequency carrier can increase or decrease based on an amount of data flow on the respective frequency carrier. In these embodiments, the increase or decrease of the inactivity period can be different for the different frequency carriers. In various embodiments, the new inactivity period for the frequency carrier (which can be the inactivity period for the frequency carrier after increasing or decreasing the previous inactivity period for the frequency carrier) can be a multiple of the initial, or baseline, inactivity period for the frequency carrier.

In some embodiments of method 1400, one or more DRX cycles include a first DRX cycle. In some embodiments, during an awake period of the first DRX cycle, each of one or more frequency carriers can be monitored. In some embodiments of method 1400, the one or more DRX cycles can include a first DRX cycle. In some embodiments, during an awake period of the first DRX cycle, only one frequency carrier is monitored. In some embodiments of method 1400, during an awake period of the first DRX cycle, each of one or more frequency carriers are monitored and during the awake period of the second DRX cycle, only one frequency carrier is monitored.

In some embodiments of method 1400, during an awake period of the first DRX cycle, a first number of frequency carriers can be monitored and during the awake period of the second DRX cycle, a second number of frequency carriers can be monitored. The first number of frequency carriers can be greater than the second number of frequency carriers.

The method can also include employing the processor to provide continuous reception on one of a plurality of frequency carriers. The one of the plurality of frequency carriers can correspond to an anchor carrier.

Figure 15:
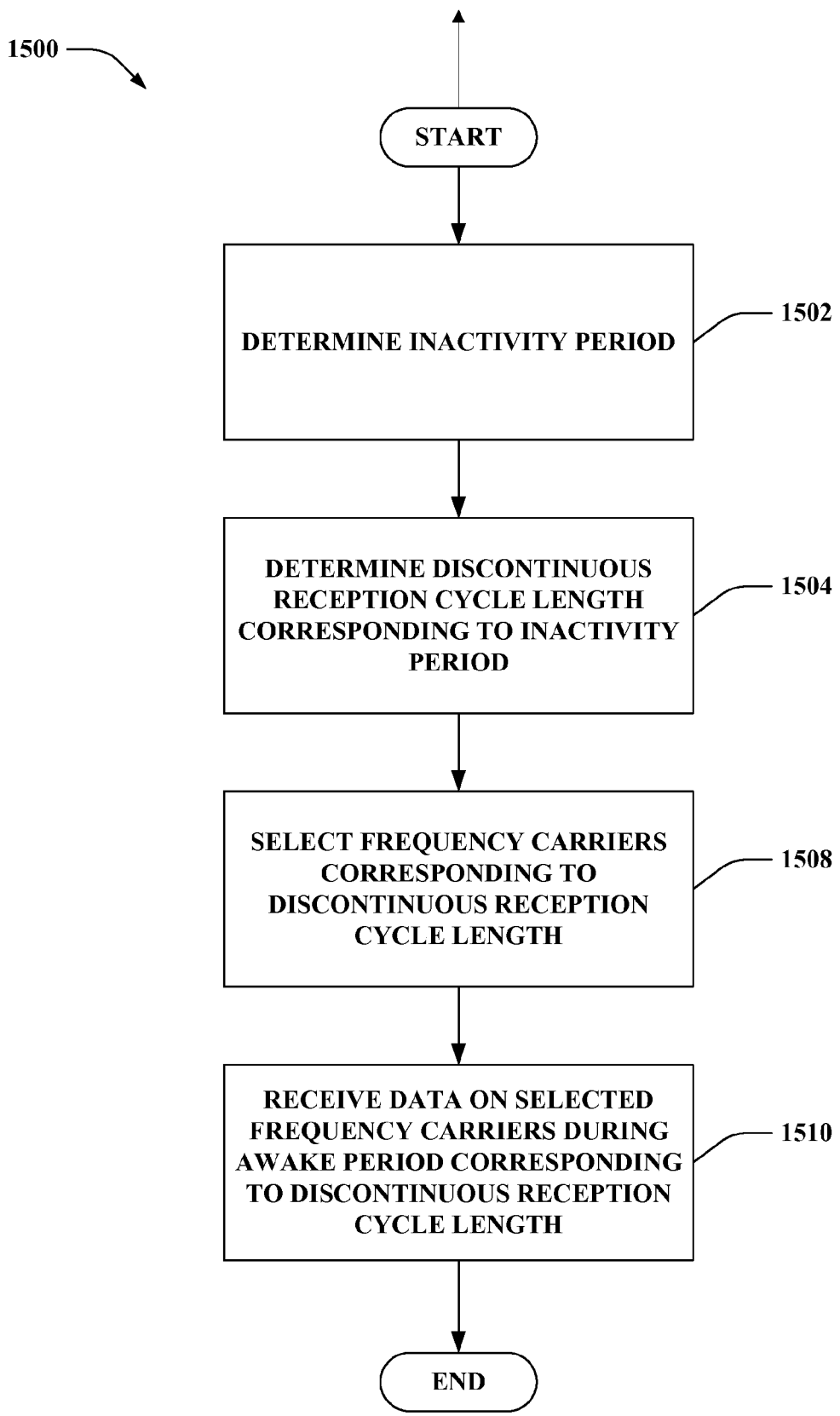

FIG. 15 illustrates an exemplary methodology that facilitates providing levels of DRX at a UE in a multicarrier wireless communication system. In the embodiment shown, at 1502, a current inactivity period is determined. At 1504, a DRX cycle length corresponding to the inactivity period is determined. In some embodiments, determination of the DRX cycle length can include determination of the awake period and/or the sleep period associated with the DRX cycle length. At 1508, the frequency carriers corresponding to the DRX cycle length can be selected. At 1510, the selected frequency carriers can be monitored, and any data thereon can be received, during the awake period corresponding to the DRX cycle length. With reference to FIG. 3, the aforementioned method can be performed at the UE 122'. In other embodiments, the aforementioned method can be performed at any UE described herein, including, but not limited to, the UE 122, 122", 122''', 122'''' described with reference to FIGS. 1, 5, 6 and 7, respectively.

Another method for DRX at a UE 122, 122', 122", 122''', 122'''' can be as follows. After each of a first, second and third inactivity period, respectively, the UE 122, 122', 122", 122''', 122'''' transitions to a first, second or third respective state wherein the UE 122 operates according to a first, second or third respective DRX cycle, and monitors a first, second or third respective set of one or more frequency carriers during the awake period corresponding to the DRX cycle.

In one embodiment, the first, second and third inactivity periods can have increasing lengths and the first, second and third DRX cycles can also have increasing lengths such that the first DRX cycle can be shorter than the second DRX cycle and the second DRX cycle can be shorter than the third DRX cycle.

After a first inactivity period, the DRX operation can include monitoring and receiving data on each of the frequency carriers, during the awake period corresponding to the first DRX cycle.

After a second inactivity period, a transition in state can occur such that the DRX operation includes monitoring and receiving data on only a single frequency carrier, during the awake period corresponding to the second DRX cycle. In some embodiments, the single frequency carrier is the anchor carrier.

After a third inactivity period, a transition in state can occur such that the DRX operation includes monitoring and receiving data also on only a single frequency carrier, during the awake period corresponding to the third DRX cycle. In some embodiments, the single frequency carrier is a non-anchor carrier.

In some embodiments, after a second or third inactivity period, a transition in state can occur such that the DRX operation includes monitoring and receiving data also on only a subset of the set of frequency carriers, during the awake period corresponding to the DRX cycle. Referring to FIG. 3, the subset can be determined by the UE 122' and/or by the DRX network control unit 302 in various embodiments. In other embodiments, the subset can be determined by the UE 122, 122", 122''', 122''''.

Figure 16:
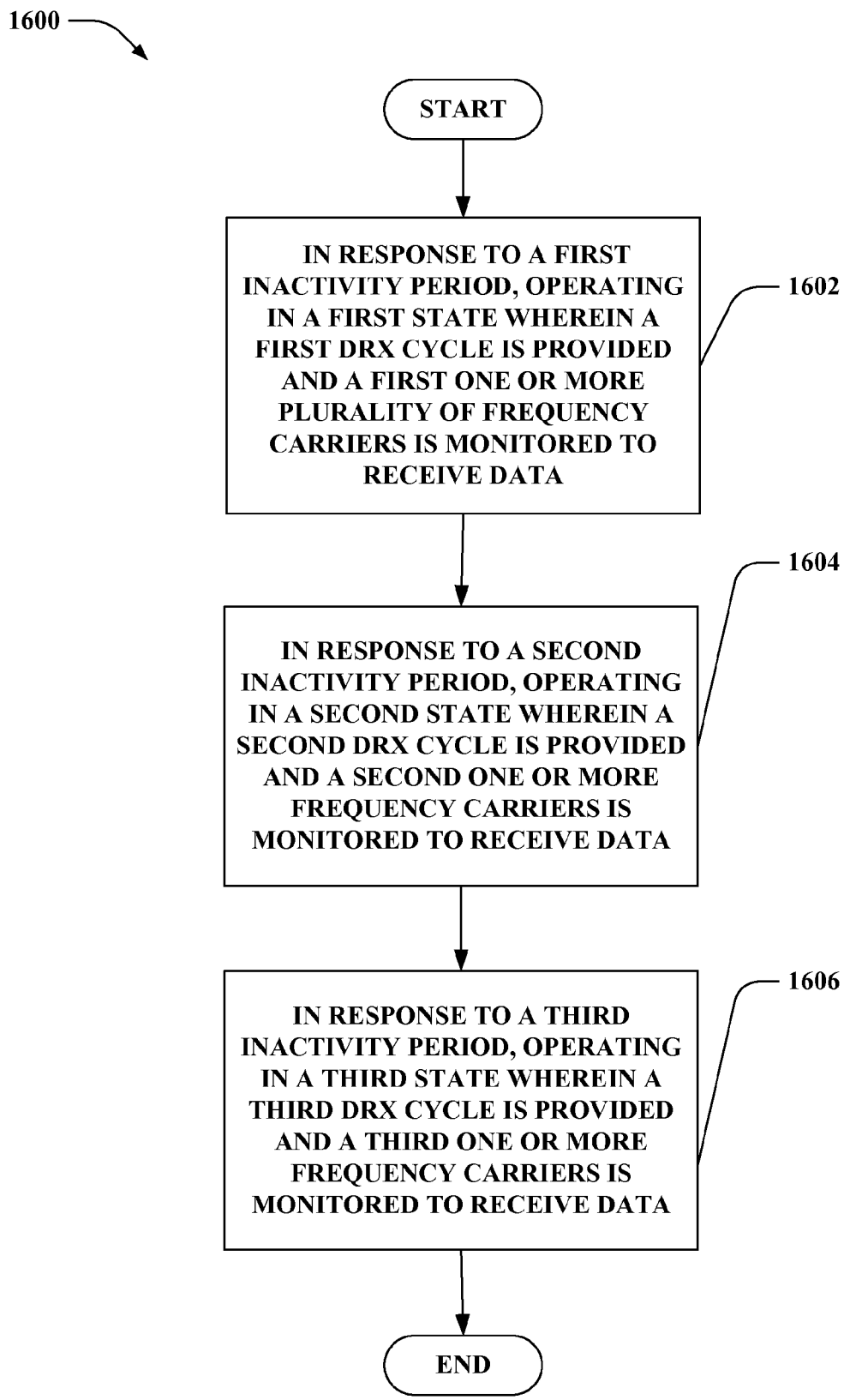

One specific embodiment of a method is illustrated with reference to FIG. 16. Turning to FIG. 16, a method 1600 that facilitates DRX is provided. The method 1600 can include, in response to a first inactivity period, operating in a first state wherein a first DRX cycle is provided and a first one or more of a plurality of frequency carriers of the multicarrier wireless system is monitored to receive data during an awake period of the first DRX cycle 1602.

The method 1600 can also include, in response to a second inactivity period, operating in a second state wherein a second DRX cycle is provided and a second one or more of the plurality of frequency carriers of the multicarrier wireless system is monitored to receive data during an awake period of the second DRX cycle 1604.

The method 1600 can also include, in response to a third inactivity period, operating in a third state wherein a third DRX cycle is provided and a third one or more of the plurality of frequency carriers of the multicarrier wireless system is monitored to receive data during an awake period of the third DRX cycle 1606.

In some embodiments, the first inactivity period can be shorter than the second inactivity period, and/or the second inactivity period can be shorter than the third inactivity period.

In some embodiments, the first DRX cycle can be shorter than the second DRX cycle, and/or the second DRX cycle can be shorter than the third DRX cycle.

In various embodiments, computer program products having computer-readable mediums comprising code can be utilized to perform the method steps and/or functions described herein. For example, a first computer program product can be provided. The computer program product can include a computer-readable medium. The computer-readable medium can include code for providing one or more DRX cycles respectively corresponding to one or more inactivity periods. During respective awake periods of the one or more DRX cycles, respective ones of one or more frequency carriers can be monitored for data reception. In some embodiments, the respective ones of one or more frequency carriers can be anchor or non-anchor carriers.

In some embodiments, the one or more DRX cycles can include a first DRX cycle and a second DRX cycle, and the one or more inactivity periods can include a first inactivity period and a second inactivity period. The first inactivity period can be shorter than the second inactivity period.

In some embodiments, the one or more DRX cycles can include a first DRX cycle. During an awake period of the first DRX cycle, each of one or more frequency carriers can be monitored. In some embodiments, the one or more DRX cycles can include a first DRX cycle. In these embodiments, during an awake period of the first DRX cycle, only one frequency carrier is monitored.

In some embodiments, during an awake period of the first DRX cycle, each of one or more frequency carriers can be monitored and during the awake period of the second DRX cycle, in some embodiments, only one frequency carrier is monitored.

In some embodiments, during an awake period of the first DRX cycle, a first number of frequency carriers can be monitored and during the awake period of the second DRX cycle, a second number of frequency carriers can be monitored. The first number of frequency carriers can be greater than the second number of frequency carriers.

In some embodiments, the computer-readable medium can also include code for providing continuous reception on one of a plurality of frequency carriers. The one of the plurality of frequency carriers can correspond to an anchor carrier.

As another example, a computer program product is provided. The computer program product can include a computer-readable medium. The computer-readable medium can include code for, in response to a first inactivity period, operating in a first state. A first DRX cycle can be provided and a first one or more of a plurality of frequency carriers of the multicarrier wireless system can be monitored to receive data during an awake period of the first DRX cycle.

The computer-readable medium can also include code for, in response to a second inactivity period, operating in a second state. A second DRX cycle can be provided and a second one or more of the plurality of frequency carriers of the multicarrier wireless system can be monitored to receive data during an awake period of the second DRX cycle.

The computer-readable medium can also include code for, in response to a third inactivity period, operating in a third state. A third DRX cycle can be provided and a third one or more of the plurality of frequency carriers of the multicarrier wireless system can be monitored to receive data during an awake period of the third DRX cycle.

In some embodiments, the first inactivity period can be shorter than the second inactivity period, and the second inactivity period can be shorter than the third inactivity period. In some embodiments, the first DRX cycle can be shorter than the second DRX cycle, and the second DRX cycle can be shorter than the third DRX cycle.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors and/or other electronic units designed to perform the functions described herein, or a combination thereof.

When the embodiments are implemented in software, firmware, middleware or microcode, program code or code segments, they can be stored in a machine-readable medium (or a computer-readable medium), such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An apparatus comprising:
a control unit for performing discontinuous reception based, at least, on parameters indicative of
one or more inactivity periods of the apparatus, and
one or more sets of frequency carriers at which the apparatus is configured to monitor and receive data,
the control unit, after a first one of the one or more inactivity periods, operating in a first state corresponding to monitoring a first one of the one or more sets of frequency carriers, and, after a second one of the one or more inactivity periods, operating in a second state corresponding to monitoring a second one of the one or more sets of frequency carriers, wherein the first inactivity period is shorter than the second inactivity period and the first number of frequency carriers is greater than the second number of frequency carriers; and
a communications unit for receiving discontinuous reception configuration information generated at a network control unit communicatively coupled to the control unit.

2. The apparatus of claim 1, wherein the control unit is also for performing continuous reception on a frequency carrier corresponding to an anchor carrier of the apparatus.

3. An apparatus comprising:
means for performing discontinuous reception based, at least, on parameters indicative of
one or more inactivity periods of the apparatus, and
one or more sets of frequency carriers at which the apparatus is configured to monitor and receive data,
the means for performing discontinuous reception is also for, after a first one of the one or more inactivity periods, operating in a first state corresponding to monitoring a first one of the one or more sets of frequency carriers, and after a second one of the one or more inactivity periods, operating in a second state corresponding to monitoring a second one of the one or more sets of frequency carriers, wherein the first inactivity period is shorter than the second inactivity period and wherein the first number of frequency carriers is greater than the second number of frequency carriers; and
means for communicating, the means for communicating being for receiving discontinuous reception configuration information generated at a means for controlling discontinuous reception communicatively coupled to the means for performing discontinuous reception.

4. The apparatus of claim 3, wherein the means for performing discontinuous reception is also for performing continuous reception on a frequency carrier corresponding to an anchor carrier of the apparatus.

5. A method that facilitates discontinuous reception, the method comprising:
employing a processor for executing computer executable instructions to provide one or more discontinuous reception cycles respectively corresponding to one or more inactivity periods, wherein, during respective awake periods of the one or more discontinuous reception cycles, data is received on respective one or more frequency carriers,
the one or more discontinuous reception cycles comprising a first discontinuous reception cycle and a second discontinuous reception cycle, and the one or more inactivity periods comprising a first inactivity period and a second inactivity period respectively corresponding to the first discontinuous reception cycle and the second discontinuous reception cycle, the first inactivity period being shorter than the second inactivity period, and
wherein data is received on a first number of frequency carriers in the first discontinuous reception cycle and data is received on a second number of frequency carriers in the second discontinuous reception cycle, and the first number of frequency carriers is greater than the second number of frequency carriers.

6. The method of claim 5, wherein, during an awake period of the first discontinuous reception cycle, each of one or more frequency carriers are monitored.

7. The method of claim 5, wherein the first inactivity period is associated with a first of the respective one or more frequency carriers and the second inactivity period is associated with a second of the respective one or more frequency carriers,
wherein the second inactivity period is a multiple of the first inactivity period, and
wherein the first inactivity period and the second inactivity period increases or decreases based on a respective amount of data flow on the first of the respective one or more frequency carriers and on a respective amount of data flow on the second of the respective one or more frequency carriers.

8. The method of claim 5, wherein during an awake period of the first discontinuous reception cycle, each of one or more frequency carriers are monitored and during an awake period of the second discontinuous reception cycle, only one frequency carrier is monitored.

9. The method of claim 5, wherein the second inactivity period is a multiple of the first inactivity period.

10. The method of claim 5, wherein the respective one or more frequency carriers are non-anchor carriers.

11. The method of claim 5, further comprising employing the processor to provide continuous reception on one of a plurality of frequency carriers, the one of the plurality of frequency carriers corresponding to an anchor carrier.

12. A computer program product, comprising:
a non-transitory computer-readable medium comprising code for providing one or more discontinuous reception cycles respectively corresponding to one or more inactivity periods, wherein during respective awake periods of the one or more discontinuous reception cycles, respective one or more frequency carriers are monitored for data reception,
the one or more discontinuous reception cycles comprising a first discontinuous reception cycle and a second discontinuous reception cycle, and the one or more inactivity periods comprising a first inactivity period and a second inactivity period respectively corresponding to the first discontinuous reception cycle and the second discontinuous reception cycle, the first inactivity period being shorter than the second inactivity period, and
wherein data reception is monitored on a first number of frequency carriers in the first discontinuous reception cycle and data reception is monitored on a second number of frequency carriers in the second discontinuous reception cycle, and the first number of frequency carriers is greater than the second number of frequency carriers.

13. The computer program product of claim 12, wherein, during an awake period of the first discontinuous reception cycle, each of one or more frequency carriers are monitored.

14. The computer program product of claim 12, wherein during an awake period of the first discontinuous reception cycle, each of one or more frequency carriers are monitored and during an awake period of the second discontinuous reception cycle, only one frequency carrier is monitored.

15. The computer program product of claim 12, wherein the respective one or more frequency carriers are non-anchor carriers.

16. The computer program product of claim 12, further comprising:
code for providing continuous reception on one of a plurality of frequency carriers, the one of the plurality of frequency carriers corresponding to an anchor carrier.

17. A method that facilitates discontinuous reception, the method comprising:
in response to a first inactivity period, operating in a first state wherein a first discontinuous reception cycle is provided and a first one or more of a plurality of frequency carriers of a multicarrier wireless system is monitored to receive data during an awake period of the first discontinuous reception cycle;
in response to a second inactivity period, operating in a second state wherein a second discontinuous reception cycle is provided and a second one or more of a plurality of frequency carriers of the multicarrier wireless system is monitored to receive data during an awake period of the second discontinuous reception cycle; and
in response to a third inactivity period, operating in a third state wherein a third discontinuous reception cycle is provided and a third one or more of a plurality of frequency carriers of the multicarrier wireless system is monitored to receive data during an awake period of the third discontinuous reception cycle.

18. The method for claim 17, wherein the first inactivity period is shorter than the second inactivity period, and the second inactivity period is shorter than the third inactivity period.

19. The method of claim 18, wherein the first discontinuous reception cycle is shorter than the second discontinuous reception cycle, and the second discontinuous reception cycle is shorter than the third discontinuous reception cycle.

20. A computer program product, comprising:
a non-transitory computer-readable medium comprising:
code for, in response to a first inactivity period, operating in a first state wherein a first discontinuous reception cycle is provided and a first one or more of a plurality of frequency carriers of a multicarrier wireless system is monitored to receive data during an awake period of the first discontinuous reception cycle;
code for, in response to a second inactivity period, operating in a second state wherein a second discontinuous reception cycle is provided and a second one or more of a plurality of frequency carriers of the multicarrier wireless system is monitored to receive data during an awake period of the second discontinuous reception cycle; and
code for, in response to a third inactivity period, operating in a third state wherein a third discontinuous reception cycle is provided and a third one or more of a plurality of frequency carriers of the multicarrier wireless system is monitored to receive data during an awake period of the third discontinuous reception cycle.

21. The computer program product of claim 20, wherein the first inactivity period is shorter than the second inactivity period, and the second inactivity period is shorter than the third inactivity period.

22. The computer program product of claim 21, wherein the first discontinuous reception cycle is shorter than the second discontinuous reception cycle, and the second discontinuous reception cycle is shorter than the third discontinuous reception cycle.

23. A system comprising:
a control unit configured to,
generate discontinuous reception control information based on time and frequency parameters, the generated discontinuous reception control information corresponds to at least one of a plurality of levels of discontinuous reception; and
output generated discontinuous reception control information; and
a user equipment capable of performing multicarrier reception of data, the user equipment being communicatively coupled to the control unit and configured to:
receive output discontinuous reception control information; and
perform discontinuous reception, on one or more frequency carriers on which the user equipment is configured to perform multicarrier reception, according to one of the plurality of levels of discontinuous reception,
wherein a first level of discontinuous reception corresponds to a first inactivity period and a first number of frequency carriers and a second level of discontinuous reception corresponds to a second inactivity period and a second number of frequency carriers, the first inactivity period is shorter than the second inactivity period and the first number of frequency carriers is greater than the second number of frequency carriers.

24. The system of claim 23, wherein the control unit is a base station.

25. The system of claim 23, wherein the user equipment is further configured to perform continuous reception on a selected frequency carrier during a time interval over which the user equipment performs discontinuous reception.

26. The system of claim 25, wherein the selected frequency carrier is an anchor carrier.

27. A system comprising:
means for generating discontinuous reception control information based on time and frequency parameters, the generated discontinuous reception control information corresponds to a plurality of levels of discontinuous reception, a first level of discontinuous reception corresponds to a first inactivity period and a first number of frequency carriers and a second level of discontinuous reception corresponds to a second inactivity period and a second number of frequency carriers, the first inactivity period is shorter than the second inactivity period and the first number of frequency carriers is greater than the second number of frequency carriers;
means for outputting generated discontinuous reception control information; and
means for communicating, the means for communicating performing multicarrier reception of data, and the means for communicating being communicatively coupled to the means for generating discontinuous reception control information and configured to,
receive output discontinuous reception control information; and
perform discontinuous reception, on one or more frequency carriers on which the means for communicating performs multicarrier reception according to one of the plurality of levels of discontinuous reception.

28. The system of claim 27, wherein the means for generating discontinuous reception control information is a base station.

29. The system of claim 27, wherein the means for communicating is further configured to perform continuous reception on a selected frequency carrier during a time interval over which the means for communicating performs discontinuous reception.

30. The system of claim 29, wherein the selected frequency carrier is an anchor carrier.

31. A method comprising:
generating, at a first apparatus, discontinuous reception control information based on time and frequency parameters, wherein the generated discontinuous reception control information corresponds to at least one of a plurality of levels of discontinuous reception, at least a first level of discontinuous reception corresponds to a first inactivity period and a first number of frequency carriers and a second level of discontinuous reception corresponds to a second inactivity period and a second number of frequency carrier, the first inactivity period is shorter than the second inactivity period and the first number of frequency carriers is greater than the second number of frequency carriers;
outputting generated discontinuous reception control information;
receiving, at a second apparatus capable of performing multicarrier reception of data, output discontinuous reception control information; and
performing discontinuous reception, on one or more frequency carriers on which the second apparatus is configured to perform multicarrier reception according to one of the plurality of levels of discontinuous reception.

* * * * *